(12) United States Patent
McNamee et al.

(10) Patent No.: US 9,497,611 B2
(45) Date of Patent: Nov. 15, 2016

(54) SYSTEMS AND METHODS FOR ENABLING SUBSCRIBER MONITORING OF TELECOMMUNICATIONS NETWORK USAGE AND SERVICE PLANS

(71) Applicant: OPENET TELECOM LTD., Dublin (IE)

(72) Inventors: Alan McNamee, Dublin (IE); Cameron Ross Dunne, Kildare (IE);
(Continued)

(73) Assignee: OPENET TELECOM LTD., Dublin (IE)

( * ) Notice: Subject to any disclaimer, the term of this patent is extended or adjusted under 35 U.S.C. 154(b) by 0 days.

(21) Appl. No.: 14/554,219

(22) Filed: Nov. 26, 2014

(65) Prior Publication Data
US 2015/0079929 A1  Mar. 19, 2015

Related U.S. Application Data

(63) Continuation of application No. 13/454,896, filed on Apr. 24, 2012, now Pat. No. 8,929,859.
(Continued)

(51) Int. Cl.
*H04M 11/00* (2006.01)
*H04W 4/24* (2009.01)
(Continued)

(52) U.S. Cl.
CPC ............ *H04W 4/24* (2013.01); *H04L 12/1407* (2013.01); *H04L 12/1414* (2013.01);
(Continued)

(58) Field of Classification Search
CPC ................. H04W 4/24; H04L 12/1407; H04L 12/1414; H04L 12/1467; H04M 15/66;
(Continued)

(56) References Cited

U.S. PATENT DOCUMENTS 6,167,445 A   12/2000  Gai et al.
6,308,216 B1  10/2001  Goldszmidt et al.
(Continued)

FOREIGN PATENT DOCUMENTS

EP  2 346 210 A1   7/2010
EP  2 242 205 A1   10/2010
(Continued)

OTHER PUBLICATIONS

European Examination Report issued for Application No. 12 165 580.7-1853, mailed on Jun. 10, 2015.
(Continued)

*Primary Examiner* — Mong-Thuy Tran
(74) *Attorney, Agent, or Firm* — The Marbury Law Group, PLLC

(57) ABSTRACT

Methods, servers and systems for managing subscriber accounts within a telecommunications network. A server may be configured to identify a network access scheme (e.g., subscription plan, service pass, etc.) associated with a subscriber account, and use contextual information received from components in the telecommunication network to intelligently determine whether to notify the user of the availability of different network access schemes based on various factors, such as based on determining whether any available service pass is more cost effective than the currently installed service pass, whether any available service pass will provide a user equipment device with an increased quality of service relative to the currently installed service pass, whether any available subscription plan will provide the user equipment device with an increased quality of service relative to the current subscription plan, or whether any available subscription plan is more cost effective than the current subscription plan.

16 Claims, 30 Drawing Sheets

(72) Inventors: Joe Hogan, Dublin (IE); Bart Lehane, Dublin (IE); Andrew D'Souza, Silver Spring, MD (US)

Related U.S. Application Data

(60) Provisional application No. 61/479,136, filed on Apr. 26, 2011, provisional application No. 61/537,419, filed on Sep. 21, 2011, provisional application No. 61/546,818, filed on Oct. 13, 2011.

(51) Int. Cl.
*H04L 12/14* (2006.01)
*H04M 15/00* (2006.01)

(52) U.S. Cl.
CPC .......... *H04L 12/1467* (2013.01); *H04M 15/66* (2013.01); *H04M 15/70* (2013.01); *H04M 15/71* (2013.01); *H04M 15/72* (2013.01); *H04M 15/723* (2013.01); *H04M 15/80* (2013.01); *H04M 15/8022* (2013.01); *H04M 15/8044* (2013.01); *H04M 15/8351* (2013.01); *H04M 15/85* (2013.01); *H04M 15/721* (2013.01); *H04M 15/745* (2013.01)

(58) Field of Classification Search
CPC ................ H04M 15/70–15/72; H04M 15/723; H04M 15/80; H04M 15/8022; H04M 15/8044; H04M 15/8351; H04M 15/85; H04M 15/721; H04M 15/745
USPC ............ 455/406, 432.1, 432.3, 435.1–435.3, 455/440, 405
See application file for complete search history.

(56) References Cited

U.S. PATENT DOCUMENTS

| | | |
|---|---|---|
| 6,363,420 B1 | 3/2002 | Coward |
| 6,427,173 B1 | 7/2002 | Boucher et al. |
| 6,862,281 B1 | 3/2005 | Chandrasekaran |
| 7,107,334 B1 | 9/2006 | Shaffer et al. |
| 7,197,546 B1 | 3/2007 | Bagga et al. |
| 7,213,068 B1* | 5/2007 | Kohli et al. ............. 709/225 |
| 8,023,425 B2 | 9/2011 | Raleigh |
| 2002/0150094 A1 | 10/2002 | Cheng et al. |
| 2003/0065812 A1 | 4/2003 | Beier et al. |
| 2003/0195919 A1 | 10/2003 | Watanuki et al. |
| 2004/0088437 A1 | 5/2004 | Stimac |
| 2006/0047836 A1 | 3/2006 | Rao et al. |
| 2006/0085549 A1 | 4/2006 | Hasti et al. |
| 2006/0165053 A1 | 7/2006 | Bhatnagar et al. |
| 2006/0230144 A1* | 10/2006 | Shah ..................... 709/225 |
| 2006/0271813 A1 | 11/2006 | Horton et al. |
| 2007/0143442 A1 | 6/2007 | Zhang et al. |
| 2007/0153995 A1 | 7/2007 | Fang et al. |
| 2007/0258460 A1 | 11/2007 | Momtahan et al. |
| 2007/0283011 A1 | 12/2007 | Rakowski et al. |
| 2008/0046573 A1 | 2/2008 | Ropolyi et al. |
| 2008/0117869 A1 | 5/2008 | Freen et al. |
| 2008/0183991 A1 | 7/2008 | Cosmadopoulos et al. |
| 2008/0212602 A1 | 9/2008 | Hobbs et al. |
| 2008/0216148 A1 | 9/2008 | Bienek et al. |
| 2008/0240150 A1 | 10/2008 | Dias et al. |
| 2009/0025010 A1 | 1/2009 | Foottit et al. |
| 2009/0049201 A1 | 2/2009 | Albert et al. |
| 2009/0049444 A1 | 2/2009 | Ottavi et al. |
| 2009/0054030 A1* | 2/2009 | Golds ..................... 455/406 |
| 2009/0063650 A1 | 3/2009 | Anslow et al. |
| 2009/0119742 A1 | 5/2009 | Graziani et al. |
| 2009/0228611 A1 | 9/2009 | Ferguson et al. |
| 2009/0249452 A1 | 10/2009 | Burke et al. |
| 2009/0285179 A1 | 11/2009 | Jones et al. |
| 2009/0305684 A1 | 12/2009 | Jones et al. |
| 2010/0017603 A1 | 1/2010 | Jones |
| 2010/0023699 A1 | 1/2010 | Reidel et al. |
| 2010/0035576 A1 | 2/2010 | Jones et al. |
| 2010/0042449 A1 | 2/2010 | Thomas |
| 2010/0185488 A1 | 7/2010 | Hogan et al. |
| 2010/0188975 A1 | 7/2010 | Raleigh |
| 2010/0197266 A1 | 8/2010 | Raleigh |
| 2010/0287080 A1 | 11/2010 | Thistle et al. |
| 2011/0010312 A1 | 1/2011 | McDonald |
| 2011/0044353 A1 | 2/2011 | Foottit et al. |
| 2011/0075671 A1 | 3/2011 | Davidson et al. |
| 2011/0124313 A1 | 5/2011 | Jones |
| 2011/0208628 A1 | 8/2011 | Foottit et al. |
| 2011/0275344 A1 | 11/2011 | Momtahan et al. |
| 2011/0276442 A1 | 11/2011 | Momtahan et al. |
| 2011/0280130 A1 | 11/2011 | Foottit et al. |
| 2012/0026879 A1 | 2/2012 | Foottit et al. |
| 2012/0088470 A1 | 4/2012 | Raleigh |
| 2012/0102224 A1* | 4/2012 | Mercuri ..................... 709/241 |

FOREIGN PATENT DOCUMENTS

| | | | |
|---|---|---|---|
| EP | 2 262 199 | A1 | 12/2010 |
| EP | 2 429 120 | A1 | 3/2012 |
| WO | 02/06973 | A1 | 1/2002 |
| WO | 2008/038862 | A1 | 4/2008 |
| WO | 2009/129840 | A1 | 10/2009 |
| WO | 2010/127593 | A1 | 11/2010 |
| WO | 2010/128391 | A2 | 11/2010 |
| WO | 2010/141727 | A1 | 12/2010 |

OTHER PUBLICATIONS

P. Calhoun et al., Diameter Base Protocol, Network Working Group, Request for Comments: 3588, Category: Standards Track, Sep. 1, 2003.
P. Eronen Ed. et al., Diameter Extensible Authentication Protocol (EAP) Application, Network Working Group, Request for Comments: 4072, Category: Standards Track, Aug. 31, 2005.
J. Wood et al., A Web Services Architecture for Visualization, Fourth IEEE International Conference on eScience, IEEE Computer Society, Dec. 7, 2008.
J. Korhonen Ed. et al., Clarifications on the Routing of Diameter Requests Based on the Username and the Realm, Network Working Group, Request for Comments: 5729, Updates: 3588 Category: Standards Track, Dec. 31, 2009.
http://www.3gpp.org, 3rd Generation Partnership Project; Technical Specification Group Services and System Aspects; Policy and Charging control architecture (Release108), 3GPP TS 23.203 V10.1.0, Sep. 29, 2010. Valbonne, France.
http://www.3gpp.org, 3rd Generation Partnership Project; Technical Specification Group Core Network and Terminals; Policy and Charging Control signalling flows and Quality of Service (QoS) parameter mapping (Release 8), 3GPP TS 29.213 V8.9.1, Oct. 4, 2010. Valbonne, France.
V. Fajardo, Ed. Et al., Diameter Base Protocol draft-ietf-dime-rfc3588bis-33.txt, Network Working Group, Internet-Draft, Obsoletes: 3588 5719 (if approved), Intended status: Standards Track, May 7, 2012. (Expires: Nov. 8, 2012).
European Search Report dated Mar. 26, 2012, issued in EP Application No. 11193496, mailed on Apr. 2, 2012.
European Search Report dated Mar. 20, 2012, issued in EP Application No. 11193537, mailed on Apr. 2, 2012.
European Search Report dated Mar. 8, 2012, issued in EP Application No. 11193476, mailed on Apr. 2, 2012.
European Search Report dated Mar. 12, 2012, issued in EP Application No. 11193460, mailed on Apr. 11, 2012.
European Search Report dated Mar. 14, 2012, issued in EP Application No. 11193499, mailed on Apr. 11, 2012.
European Search Report dated May 25, 2012, issued in EP Application No. 11193561, mailed on Jun. 4, 2012.
Intention to Grant issued by the European Patent Office in European Application No. 12 165 569.0 on Nov. 19, 2013.
Extended European Search Report for European Application No. 12165580 mailed on Nov. 4, 2014.

(56) References Cited

OTHER PUBLICATIONS

Wikipedia, the free encyclopedia, Multitier Architecture, Three-tier architecture, Oct. 23, 2014.
European Search Report dated Jul. 31, 2012, issued in EP Application No. 12165563, mailed on Aug. 6, 2012.
European Search Report dated Jul. 31, 2012, issued in EP Application No. 12165566, mailed on Aug. 28, 2012.
European Search Report dated Aug. 8, 2012, issued in EP Application No. 12165569, mailed on Aug. 16, 2012.
European Search Report dated Aug. 24, 2012, issued in EP Application No. 12165572, mailed on Sep. 3, 2012.
European Search Report dated Sep. 26, 2012, issued in EP Application No. 12165576, mailed on Oct. 4, 2012.
Lehane et al., European Application No. 12 165 569.0-1862; Intention to Grant issued by the European Patent Office Nov. 19, 2013.
European Examination Report issued for Application No. 12 165 580.7-1853, mailed on Mar. 10, 2016.

\* cited by examiner

Communication Interfaces/Protocols

SYSTEMS AND METHODS FOR ENABLING SUBSCRIBER MONITORING OF TELECOMMUNICATIONS NETWORK USAGE AND SERVICE PLANS

RELATED APPLICATIONS

This application is a continuation of U.S. patent application Ser. No. 13/454,896 titled "Systems for Enabling Subscriber Monitoring of Telecommunications Network Usage and Service Plans" filed on Apr. 24, 2012, which claims the benefit of priority to each of U.S. Provisional Application No. 61/479,136, titled "Mobile application server that Enables Users to Directly Access Telecommunications Operator Services" filed Apr. 26, 2011; U.S. Provisional Application No. 61/537,419, titled "Mobile application server that Enables Users to Directly Access Telecommunications Operator Services" filed Sep. 21, 2011; and U.S. Provisional Application No. 61/546,818, entitled "Mobile application server that Enables Users to Directly Access Telecommunications Operator Services" filed Oct. 13, 2011, the entire contents of all of which are hereby incorporated by reference.

BACKGROUND

Wireless and cellular communication technologies have seen dramatic improvements over the past few years. Cellular service providers now offer users a wide array of services, higher usage limits and attractive subscription plans. Wireless dongles and embedded wireless modem cards allow network subscribers to use tablet computers, netbooks and laptops to access wireless Internet protocol (IP) and data services through the cellular networks. Internet-enabled smart phones, tablets and gaming consoles have become essential personal accessories, connecting subscribers to friends, work, leisure activities, and entertainment. Subscribers now have more choices and expect to have access to content, data, and communications at any time, in any place, and at a reasonable cost. As service providers continue to offer additional services and service plans, providing subscribers with effective account management and monitoring tools is becoming an important and challenging task.

SUMMARY

The various embodiments include methods of accessing live charging information in a telecommunications network, including receiving in a mobile application server a first charging request from a user equipment, identifying a relevant charging system based on the first charging request, generating a second charging request message based on the first charging request, sending the generated second charging request to the identified charging system for processing, receiving in the mobile application server a first response message including charging information from the identified charging system in response to sending the generated second charging request to the identified charging system, generating in the mobile application server a second response message based on the charging information included in the first response message, and sending from the mobile application server the generated second response message to the user equipment. In an embodiment, receiving a first charging request from a user equipment may include receiving a charging request that may include at least one of charging information associated with a specific network subscriber, charging information associated with a subscriber defined counter, charging information associated with a specific service for the specific network subscriber, charging information associated with non-telecommunications related service, and charging information associated with specific devices belonging to the specific network subscriber. In a further embodiment, sending the generated second charging request to the identified charging system for processing may include sending a charging request that instructs the identified charging system to modify charging information.

In a further embodiment, the method may include setting a threshold based on information included in the first charging request. In a further embodiment, the method may include sending a notification to the user equipment when the set threshold is breached. In a further embodiment, identifying a relevant charging system based on the first charging request may include receiving information from subscriber repository, determining a charging system type based on the information received from subscriber repository, and identifying the relevant charging system based on the determined charging system type. In a further embodiment, identifying a relevant charging system based on the first charging request may include identifying one of an online charging system (OCS) and an offline charging system (OFCS).

In a further embodiment, the method may include predicting future charging spending balances and rates based on the charging information included in the first response message. In a further embodiment, receiving a first charging request from a user equipment may include receiving a charging request that may include information for obtaining network connectivity without having a prior commercial relationship. In a further embodiment, receiving a first charging request from a user equipment may include receiving a charging request that may include loyalty information. In a further embodiment, receiving a first charging request from a user equipment may include receiving a charging request that may include information for transferring cost information from a first billing category to a second billing category.

Further embodiments may include a server configured with server-executable instructions to perform various operations corresponding to the methods discussed above.

Further embodiments may include a computing device having a processor configured with processor-executable instructions to perform various operations corresponding to the methods discussed above.

Further embodiments may include a computing device that may include various means for performing functions corresponding to the method operations discussed above.

Further embodiments may include a non-transitory processor-readable storage medium having stored thereon processor-executable instructions configured to cause a processor to perform various operations corresponding to the method operations discussed above.

Further embodiments may include a system having a computing device that may include a transceiver, a memory, and a device processor coupled to the memory and transceiver, and a communications server having a server transceiver, a server memory and a server processor coupled to the server memory, in which the server and/or device processors are configured with processor executable instructions to perform various operations corresponding to the methods discussed above.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
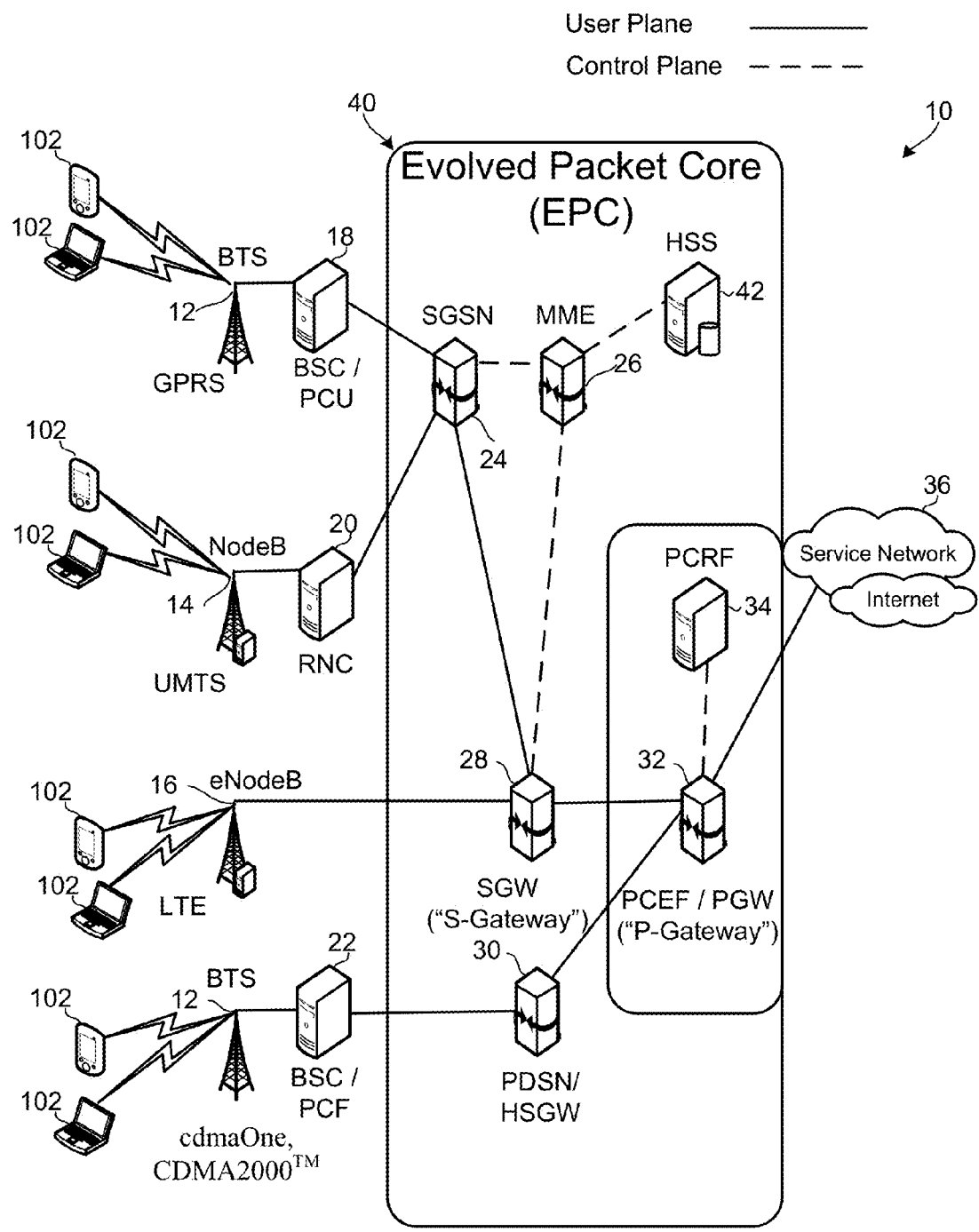
FIG. 1 is a communication system block diagram illustrating network components of a communication system having an evolved packet core (EPC) architecture suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "wireless device" and "user equipment" (UE) may be used interchangeably and refer to any one of various cellular telephones, smart-phones (e.g., iPhone®), personal data assistants (PDA's), palm-top computers, tablet computers (e.g., iPad®), laptop computers, wireless electronic mail receivers (e.g., Blackberry®), VoIP phones, wire-line devices, devices implementing Machine-to-Machine (M2M) technologies, multimedia/Internet enabled cellular telephones, IP enabled televisions, IP enabled entertainment systems, and similar electronic devices that include a programmable processor and are capable of sending and receiving wireless or wireline communication signals. In a preferred embodiment, the wireless device is a cellular handheld device (e.g., a mobile device), which may communicate via a cellular telephone communications network.

The phrases "Diameter reference points," "Diameter applications," and "Diameter interfaces" may be used interchangeably and refer to specific implementations of the Diameter protocol. However, when possible, the phrase "Diameter application" is used to describe an extension of the Diameter base protocol (which is built on top of the Diameter base protocol) and the phrase "Diameter reference point" is used to describe an interface between network components that employ the Diameter protocol to realize communications (i.e., network components realize communications over a reference point). Diameter applications may use the same name as Diameter reference points (e.g., Gx reference point and Gx Diameter application), the distinction being that at each end of the reference point there may be a client node and a server node.

A number of different cellular and mobile communication services and standards are available or contemplated in the future, all of which may implement and benefit from the various embodiments. Such services and standards include third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology, unless specifically recited in the claim language.

In recent years, telecommunication service providers have begun offering many new services, and user equipment devices (e.g., cellular phones, smartphones, tablets, laptop computers, etc.) have become faster and more feature-rich than ever. For example, smartphones now have impressive processing capabilities, high speed communication circuitry (e.g., radios, modems, etc.), and are capable of executing powerful network-intensive applications. Smartphone applications that involve network usage include, for example, productivity applications (e.g., calendars, video conferencing, etc.), photo and video applications (YouTube®, Netflix®, etc.), social media applications (e.g., Facebook®, etc.), and other similar applications that generate and/or consume large amounts of information exchanged over telecommunications and/or IP networks. Likewise, traditional telephony systems have improved and converged with IP/data systems, resulting in lower wireless data subscription costs and improved network speeds. These advances have resulted in a dramatic increase in the volume of information being communicated on wireless networks, and are driving the ever-increasing customer demand for wireless communications.

To meet customer demands and manage increases in network traffic, telecommunication service providers now offer their customers a wide array of subscription plans, including pre-paid plans, flat-rate plans, actual usage plans, unlimited usage plans, post-paid plans, usage-limited plans, multi-user plans, and various other plans based on the amount of bandwidth, voice, text, data, and/or other services used per billing period. These plans enable service providers to offer their customers feature combinations that meet their customers' usage needs, while maximizing revenue and/or reducing network traffic. However, the proliferation of such subscription plans has increased the complexity of managing subscriber accounts, particularly from the subscriber's perspective. Subscribers are often confused about the types or amounts of services they may consume and/or the costs associated with consuming certain services. As a result, customers may experience "bill shock" when charges for services used during a month exceed their cost expectations.

To help customers manage the complexity associated with the wide variety of available subscriber services and service plans, telecommunications operators have begun to provide subscribers with web-based access to their accounts. However, telecommunications operators often do not have full access to all of the components in the network and, as a result, cannot provide subscribers with access to certain network resources (e.g., online charging systems discussed below) or provide them with complete information regarding certain details of their usage or subscription plans (e.g., details relating to charging, metering, balance, policy, etc.). Also, existing solutions only provide customers with access to usage information (e.g., via a website that displays data consumption in MBs for the current month) and do not allow customers to set fine grain controls, such as real time usage limits.

The various embodiments provide subscribers with a more complete access to network resources and subscription plan information, enabling subscribers to more fully monitor and control data communication costs and services on their user equipment devices. The various embodiments include methods, devices, and systems that enable customers to use their user equipment devices to directly access and modify information maintained within a telecommunications network operator's business and operating systems infrastructure. Various embodiments enable subscribers to monitor on the user equipment their actual service usage, comparing their usage against one or more quotas, simplifying the management of subscriber accounts. Various embodiments enable subscribers to set fine grain controls (e.g., usage limits) that operate independently from the telecommunication service providers. Various embodiments enable subscribers to analyze and compare their past and predicted services usage with available subscription plans, and identify other subscription plans that are likely to be more cost effective.

The various embodiments may be implemented within a variety of telecommunication systems, an example of which is illustrated in FIG. 1. Wireless devices 102 may be configured to send and receive voice, data, and control signals to and from a service network 36 (and ultimately the Internet) using a variety of communication systems/technologies (e.g., GPRS, UMTS, LTE, cdmaOne, CDMA2000™). In the example illustrated in FIG. 1, general packet radio service (GPRS) data transmitted from a wireless device 102 is received by a base transceiver station (BTS) 12 and sent to a base station controller (BSC) and/or packet control unit (PCU) component (BSC/PCU) 18. Code division multiple access (CDMA) data transmitted from a wireless device 102 is received by a base transceiver station 12 and sent to a base station controller (BSC) and/or point coordination function (PCF) component (BSC/PCF) 22. Universal mobile telecommunications system (UMTS) data transmitted from a wireless device 102 is received by a NodeB 14 and sent to a radio network controller (RNC) 20. Long term evolution (LTE) data transmitted from a wireless device 102 is received by an eNodeB 16 and sent directly to a serving gateway (SGW) 28 located within the EPC 40.

The BSC/PCU 18, RNC 20 and BSC/PCF 22 components process the GPRS, UMTS and CDMS data, respectively, and send the processed data to a node within the EPC 40. More specifically, the BSC/PCU 18 and RNC 20 units send the processed data to a serving GPRS support node (SGSN) 24, and the BSC/PCF 22 sends the processed data to a packet data serving node (PDSN) and/or high rate packet data serving gateway (HSGW) component (PDSN/HSGW) 30. The PDSN/HSGW 30 may act as a connection point between the radio access network and the IP based PCEF/PGW 32. The SGSN 24 is responsible for routing the data within a particular geographical service area and may send signaling (control plane) information (e.g., information pertaining to communication setup, security, authentication, etc.) to a mobility management entity (MME) 26. The MME may request subscriber and subscription information from a home subscriber server (HSS) 42, perform various administrative tasks (e.g., subscriber authentication, enforcement of roaming restrictions, etc.), select a SGW 28, and send administrative and/or authorization information to the SGSN 24.

Upon receiving the authorization information from the MME 26 (e.g., an authentication complete indication, an identifier of a selected SGW, etc.), the SGSN 24 sends the GPRS/UMTS data to a selected SGW 28. The SGW 28 stores information about the data (e.g., parameters of the IP bearer service, network internal routing information, etc.) and forwards user data packets to a policy control enforcement function (PCEF) and/or packet data network gateway (PGW) 32. The PCEF/PGW 32 sends signaling information (control plane) to a policy control rules function (PCRF) 34. The PCRF 34 accesses subscriber databases, creates a set of policy rules and performs other specialized functions (e.g., interacts with online/offline charging systems, application functions, etc.) and sends the intelligent policy rules to the PCEF/PGW 32 for enforcement. The PCEF/PGW 32 implements the policy rules to control the bandwidth, the quality of service (QoS), the characteristics of the data, and the services being communicated between the service network 36 and the end users (e.g., network subscribers).

Figure 2:
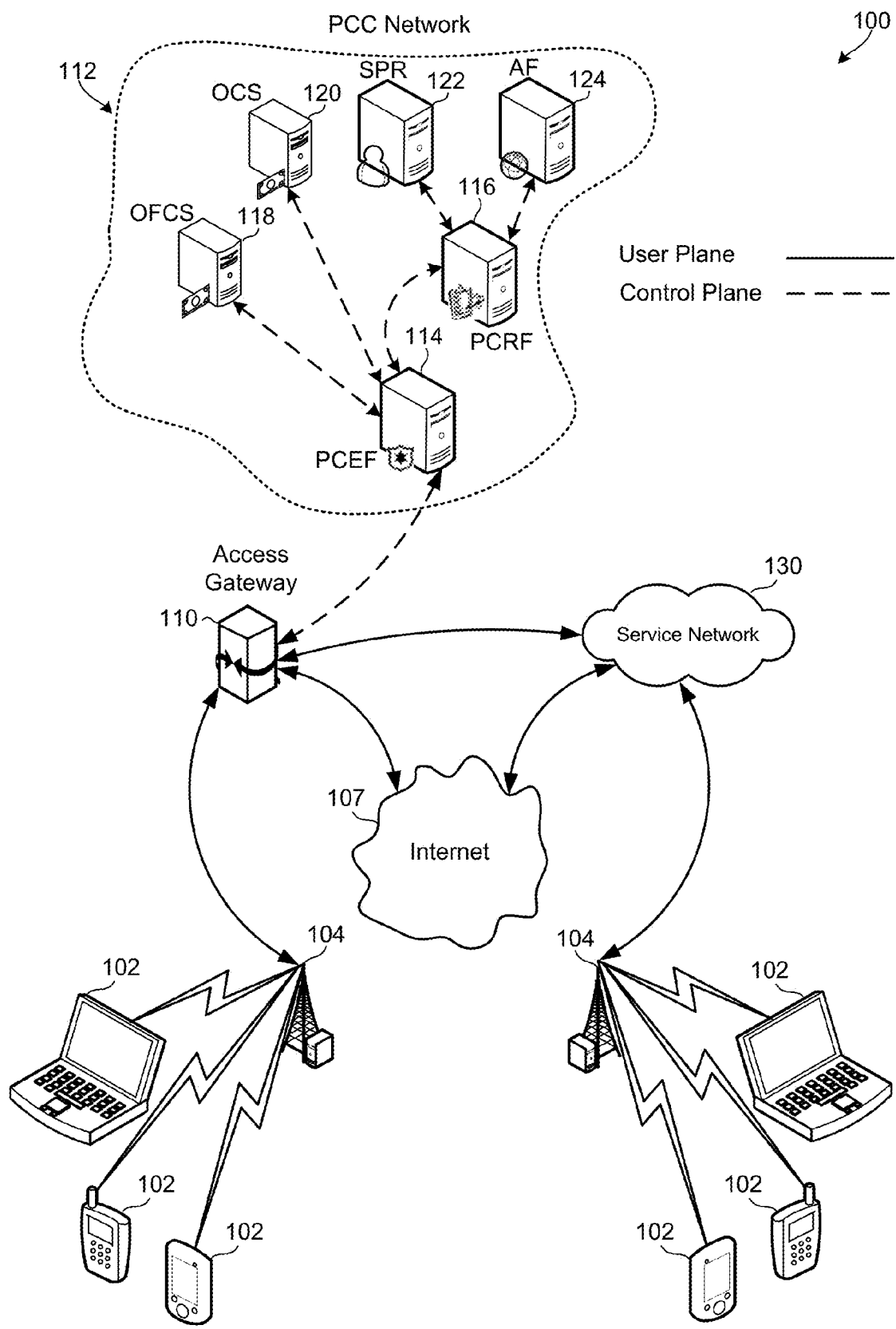
FIG. 2 is a communication system block diagram illustrating network components of an example communication-system having a policy and charging control (PCC) network in accordance with the various embodiments.

FIG. 2 illustrates various logical components in an example communication system 100 suitable for implementing the various embodiments. Wireless devices 102 may be configured to communicate via a cellular telephone network, a radio access network (e.g., UTRAN, RAN, etc.), WiFi network, WiMAX network, and/or other well known technologies (e.g., GPRS, UMTS, LTE, cdmaOne, CDMA2000™). FIG. 2 illustrates that wireless devices 102 may be configured to transmit and receive voice, data, and control signals to and from a base station (e.g., base transceiver station, NodeB, eNodeB, etc.) 104. The base station may be coupled to a controller (e.g., cellular base station, radio network controller, service gateway, etc.) operable to communicate the voice, data, and control signals between mobile devices and to other network destinations. In the illustrated example of FIG. 2, the base station 104 communicates with an access gateway 110, which serves as the primary point of entry and exit of wireless device traffic and connects the wireless devices 102 to their immediate service provider and/or packet data networks (PDNs). The access gateway 110 may include one or more of a controller, a gateway, a serving gateway (SGW), a packet data network gateway (PGW), an evolved packet data gateway (ePDG), a packet data serving node (PDSN), a serving general packet radio service support node (SGSN), or any combination of the features/functions provided thereof. Since these components are well known, certain details have been omitted in order to focus the descriptions on the most relevant features.

The access gateway 110 forwards the voice, data, and control signals to other network components as user data packets, provides connectivity to external packet data networks, manages and stores contexts (e.g. network internal routing information, etc.), and acts as an anchor between different technologies (e.g., 3GPP and non-3GPP systems). The access gateway 110 may coordinate the transmission and reception of data to and from the Internet 107, as well as the transmission and reception of voice, data, and control information to and from an external service network 130 connected to the Internet 107, to other base stations 104 and to wireless devices 102. The access gateway 110 may also route control information to a policy and charging control (PCC) network 112, which may be a part of an implementation of an evolved packet core (EPC)/long term evolution (LTE) architecture. In the various embodiments, the access gateway 110 may be a part of the policy and charging control network 112, and the functions described may be implemented in a single computing device or in many computing devices coupled in a local area network or wide area network using any of the above mentioned telecommunication technologies (e.g., 3G, 4G, GPRS, UMTS, LTE, etc.).

Returning to FIG. 2, as mentioned above, the access gateway 110 routes control/signaling information (e.g., call setup, security, authentication, charging, enforcement of policy rules, etc.) to the policy and charging control (PCC) network 112, which is an example of a telecommunications signaling network. The PCC network 112 provides policy and service control rules, controls charging functionalities, and provides quality of service (QoS) authorizations. The PCC network 112 may include one or more components for a policy and charging enforcement function (PCEF) 114, a policy charging rules function (PCRF) 116, an off-line charging system (OFCS) 118, an on-line charging system (OCS) 120, a subscriber profile repository (SPR) 122, and an application function (AF) 124.

Components in the PCC network 112 (e.g., PCEF, PCRF, OFCS, OCS, SPR, AF) may communicate using a standardized protocol, such as the Diameter protocol, remote authentication dial in user service (RADIUS) protocol, session initiation protocol (SIP), or any other telecommunications network protocol. To focus the discussion on the relevant features and functionalities, the various embodiments are described with reference to the Diameter protocol. However, it is to be understood that the various embodiments are protocol agnostic and should not be limited to the Diameter protocol unless expressly recited in the claims.

Figure 3:
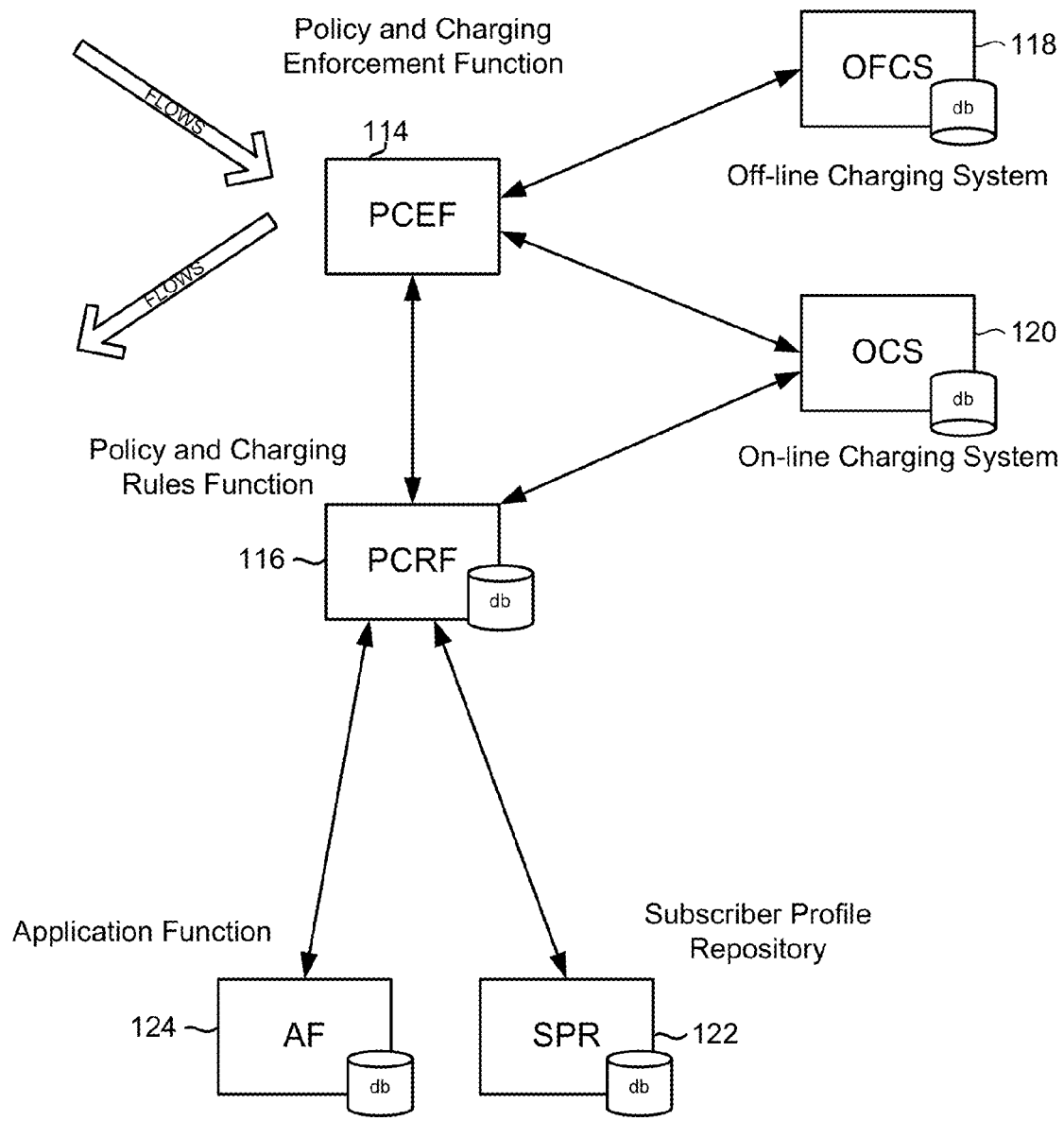
FIG. 3 is a network architectural diagram illustrating logical components and information flows in an example policy and charging control network.

FIG. 3 is an architectural diagram illustrating communications between the various logical components in a PCC network 112. The PCC network 112 may include a policy and charging enforcement function (PCEF) component 114 that serves as the primary enforcement point, gateway, and a routing mechanism between the Internet and the radio infrastructure/radio access network. As discussed above, the PCEF component 114 may be a part of, or perform operations typically associated with, a gateway GPRS support node (GGSN), a packet data network gateway (PGW), or other similar components. Detailed information about policy and charging enforcement function operations may be found in "3rd Generation Partnership Project Technical Specification Group Services and System Aspects, Policy and Charging Control Architecture," TS 23.203 (updated Mar. 9, 2012), the entire contents of which are incorporated herein by reference.

The PCEF 114 may receive signaling messages from a gateway (e.g., Access Gateway 110 illustrated in FIG. 2), and use information contained within the signaling messages to select an optimal route and a quality of service (QoS) for a particular type of service, as well as to enforce various policies on the services. The enforcement of policies may include querying, coordinating, removing, revoking, and/or adjusting various resources (e.g., network resources, subscriber resources, etc.) based on a set of policy rules.

The PCEF 114 enforces policies by implementing a set of policy rules. Each policy rule may govern the services, QoS, and/or bandwidth that are to be made available to a particular subscriber. The policy rules may also govern the times when certain services are made accessible to the subscriber (e.g. weekdays from 9 AM to 5 PM, etc.) and how long the subscriber may access those services (e.g., 15 minutes at a time, a total of two hours, etc.)

The PCRF 116 is responsible for identifying the appropriate policy rules for a given communication session of a given subscriber or terminal device, and sending the identified policy rules to the PCEF 114 for enforcement. Specifically, the PCRF 116 is responsible for generating, compiling, and selecting a set of business and technology rules that define the policies that are to be enforced for particular call sessions. The PCRF 116 may make rule decisions on a per-subscriber, per-session and/or per-service basis. For example, the PCRF 116 may use subscriber information (e.g., subscriber's city of residence), the current usage parameters (e.g., day of week, time of day, peak hours, etc.), the subscriber's service level (e.g., Gold, Bronze, etc.), and other information related to the subscriber, session, or service to generate and/or select one or more rules or a rule group. The selected rules or rule group may be communicated to the PCEF 114 (e.g., via the Gx interface) as a profile that defines the policies to be enforced. The PCRF 116 may include one or more databases for storing default rules, maintaining generated rules, and keeping track of session information.

The PCRF 116 may request subscriber profile information from the subscriber profile repository (SPR) 122, which maintains subscriber profiles (e.g., customer IDs, preferences, subscription levels, balances, etc.) in one or more data stores.

An application function (AF) 124 represents a node involved in the delivery of an application or service (e.g., voice-over-IP, voice and video call, video-on-demand, etc.) that may be used by a subscriber or that may have dealings with the subscriber. The AF 124 may communicate with the PCRF 116 to ensure that the generated rules are sufficient to provide subscribers with a quality of service (QoS) commensurate with the requirements of their requested services/flows. For example, if a current policy is being enforced based on rules for receiving a particular service (e.g., a voice-over-IP call) and the subscriber requests an additional amount of a given service, or another service (e.g., a voice and video call), the application function 124 component may push a new set of rules to the PCRF 116 reflecting the service changes (e.g., QoS, etc.) required for the additional services. The application function may also store information unique to each subscriber, service, session, and/or application.

In addition to receiving rules from the PCRF 116, the PCEF 114 component may also communicate with an on-line charging system (OCS) 120 and an offline charging system (OFCS) 118 to identify the policies that are to be enforced and/or to ensure proper charging. For example, the PCEF 114 may periodically inform the OFCS 118 of the amount of wireless data that is being used by a subscriber. The OFCS 118 may use this information to monitor the aggregate amount of data/service used by each subscriber, and to generate a record that may be collected, processed, formatted, correlated, aggregated, filtered, and/or sent to an external billing system for processing into a billing statement. In order to monitor the data/service usage of each subscriber, the OFCS 118 may store information related to each subscriber, session, and/or service.

The PCEF 114 may also periodically inform the OCS 120 of services requested by a subscriber. The OCS 120 is generally responsible for determining if the subscriber has sufficient funds/credits/access units to receive a requested service. In various embodiments, the OCS 120 may also perform other operations related to charging, balance management, and real time rating. The OCS 120 may grant or deny access based on the amount of fund/credits/access units available. In an embodiment, the OCS 120 may manage pre-pay services. In an embodiment, the OCS 120 may manage a combination of pre-pay and post-pay services in which some (or a portion) of the services require a pre-paid balance and some (or a portion) of the services may be billed to the client. In any case, the PCEF 114 may issue requests for service authorization to the OCS 120, and the OCS 120 may respond with a message granting or denying authorization. As part of its operations, the OCS 120 may store information unique to each subscriber, session, and/or service.

Figure 4:
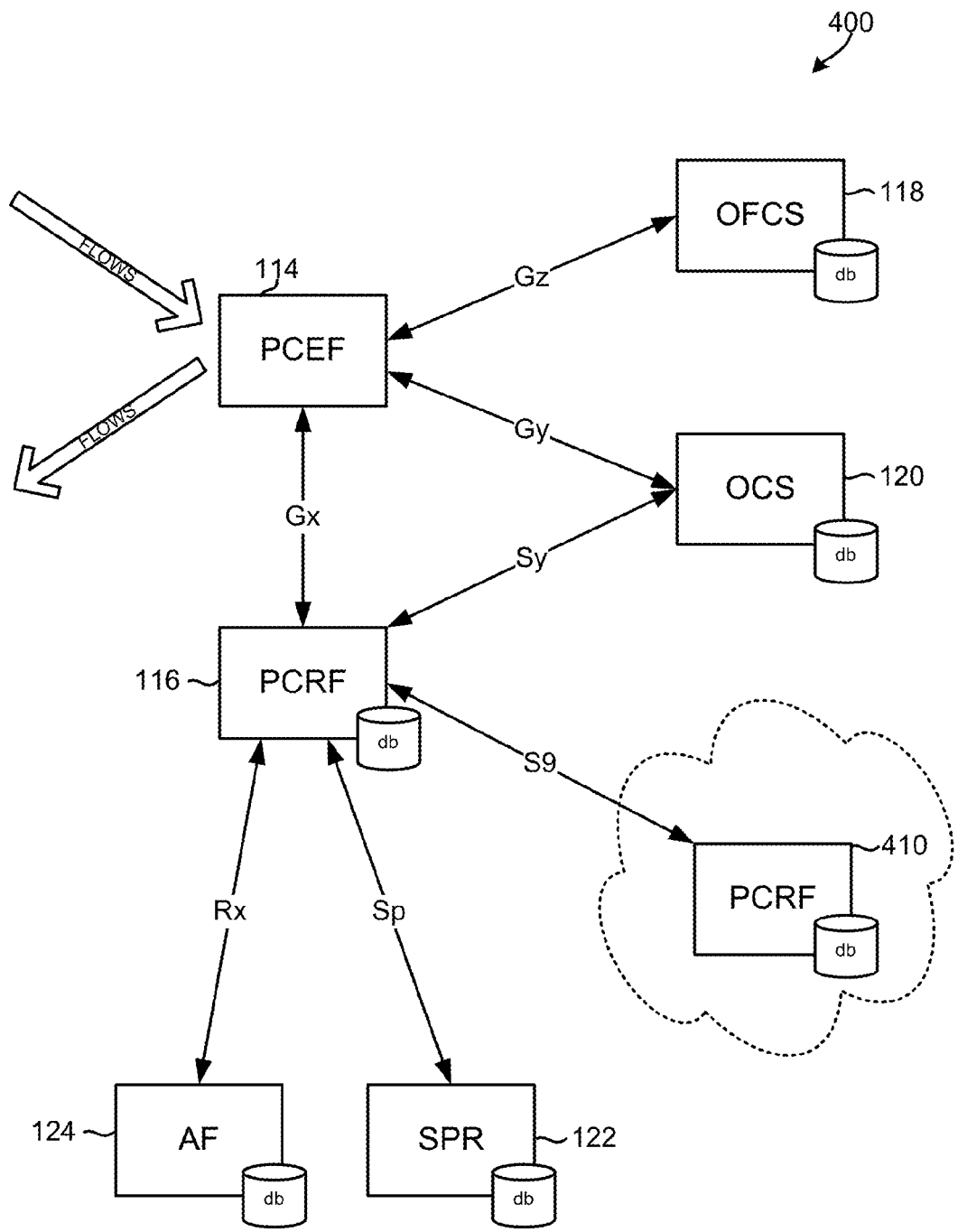
FIG. 4 is a network architectural diagram illustrating logical components and communication protocols in an example policy and charging control network.

FIG. 4 is an architectural diagram illustrating the use of Diameter applications/interfaces for communications between the various logical components in an example policy and charging control (PCC) network 400. As mentioned above, the logical components may communicate using a protocol, such as RADIUS, SIP or Diameter. Diameter is a protocol standardized by the Internet Engineering Task Force (IETF) and adopted by the Third Generation Partnership Project (3GPP). Diameter is an extensible protocol that provides a general mechanism for two or more nodes in a network to communicate signaling information (e.g., communications involving call setup, security, authentication, charging, enforcement of policy rules). Diameter also includes numerous access control features that make it highly useful in authentication, authorization, and accounting (AAA) systems, as well as in the policy and charging control network 112. Detailed information about the Diameter protocol may be found in "Network Working Group Request for Comments: 3588; Diameter Base Protocol," the entire contents of which are hereby incorporated by reference for purposes of disclosing the protocol details.

The Diameter protocol provides a base protocol (i.e., "Diameter base protocol") and a framework for defining custom extensions (i.e., "Diameter applications") to the base protocol. The base protocol defines a set of generic messages useful for low-level operations (e.g., establishing connectivity, hand-shaking, etc.) and the framework allows application-developers to develop Diameter applications (i.e., extensions of the Diameter base protocol) that define custom messages for more specialized operations. By extending the Diameter base protocol, Diameter applications may use all of the features provided by the Diameter base protocol, as well as any custom protocol extensions they define. For example, a Diameter application may use Diameter base protocol components to define exactly how messages are to be communicated and define custom extensions that describe the content of the messages being communicated.

As mentioned above, logical components (e.g., PCEF 114, PCRF 116, AF 124, SPR 122, OCS 120, OFCS 118) in the PCC network 400 may use the Diameter protocol to communicate with each other. Components that use the Diameter protocol may support various standardized Diameter applications (e.g., Gx, Gy, Gz, Rx, Sy, etc.) that are especially well suited for their specialized operations.

The logical components (e.g., PCEF 114, PCRF 116, AF 124, SPR 122, OCS 120, OFCS 118) in the PCC network 400 may also communicate with resources outside of the provider network. For example, the PCRF 116 in a home provider network may need to communicate with an external PCRF 410 in another provider network, such as while a subscriber's cell phone roams in the other provider's network. The external PCRF 410 may communicate with the appropriate logical components (e.g., PCRF 116, OCS 120, etc.) in the home provider network to ensure proper charging, QoS, etc. In the illustrated example, the external PCRF 410 communicates with PCRF 116 through the S9 interface.

To focus the discussion on the relevant features, various logical components (e.g., PCEF, PCRF, AF, SPR, OFCS, OCS, etc.) are described as using specific Diameter protocols. However, it should be understood that any protocol may be used (e.g., RADIUS, SIP, etc.) and nothing in the claims should be limited to a particular interface, protocol or application, unless expressly recited in the claims.

One of the successes of modern user equipment, such as smart phones, is related to the ease and convenience with which applications may be downloaded from the application stores. Accordingly, telecommunications operators have endeavored to create applications that have enabled them to offer a range of services to their customers to access from their user equipment. These telecommunications applications have typically been created using a three tier approach in which the telecommunications network (e.g., networks illustrated in FIG. 1 or FIG. 2) is organized into a client-side tier, a middle tier, and a back-end infrastructure tier. The client-side tier may include software that runs on the user equipment, the back-end infrastructure tier may include computer systems that reside in a telecommunications operator's infrastructure and provide operator services (e.g., identity and authorization management, policy management, charging management, etc.), and the middle tier may include software (e.g., an application server on the Internet) that links the client and infrastructure tiers.

While the three tier approach has certain benefits, there are numerous difficulties associated with integrating a telecommunications operator's back-end infrastructure with applications that are designed to run on user equipment. For instance, telecommunications operators do not have full access to all of the components in the network, and cannot provide subscribers with access to certain network resources (e.g., online charging system 120 illustrated in FIG. 3) or provide them with complete information regarding certain details of their usage or subscription plans (e.g., details relating to charging, metering, balance, policy, etc). Also, existing solutions only provide subscribers with access to usage information (e.g., via a website that displays data consumption in MBs for the current month) and do not allow the subscriber to set fine grain controls (real time usage limits).

The various embodiments provide subscribers with a more complete access to network resources and subscription plan information, enabling subscribers to more fully monitor and control data communication costs and services on their user equipment. Various embodiments include mobile application server (MAS) systems, which may be architecturally similar to (and compatible with) the middle tier in the three tier approach used to deploy other applications for telecommunication operators. Examples of applications that could harness the various embodiments include: services provided by third party telecommunications operators (e.g., roaming services, transit services, etc.), services provided by third party partners (e.g., mobile-commerce applications, payment services, etc.), services provided by applications that reside within a cloud architecture, and Web 2.0 style "over the top" applications and services (e.g., YouTube®, video downloads, Internet widgets) that run "on top" of the services being provisioned directly by the service provider.

Figure 5:
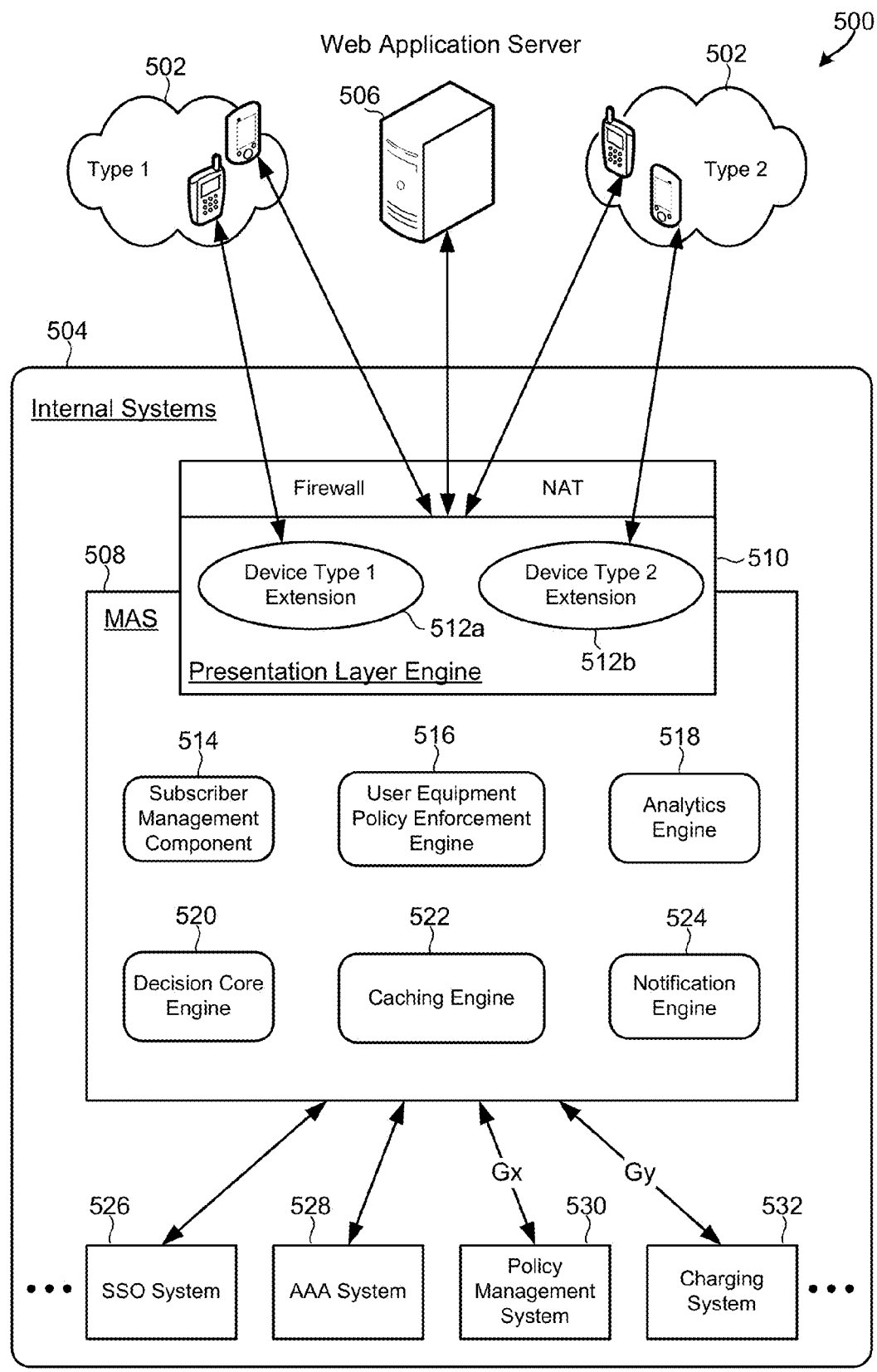
FIG. 5 is a system block diagram illustrating logical components and information flows in a communication system suitable for implementing the various embodiments.

FIG. 5 illustrates logical components and information flows in a communication system 500 suitable for implementing the various embodiments. The communication system 500 may include a plurality of user equipment 502, internal systems 504, and a web application server 506. The internal systems 504 may include all of the communications networks, resources, components, and systems that are logically between the user equipment 502 and the web application server 506. In the example illustrated in FIG. 5, the internal systems 504 may include a mobile application server (MAS) 508, a generic presentation layer engine component 510, a single sign on (SSO) system component 526, an AAA system component 528, a policy management system component 530, and a charging system component 532. In various embodiments, the presentation layer engine 510 may be a component of the mobile application server 508, or may be external to the mobile application server 508. In various embodiments, the internal systems 504 may further include a billing system, an external charging system, a profile manager system, and/or other components of the telecommunications service provider network.

The user equipment 502 may be terminal equipment owned and operated by a subscriber. Examples of user equipment 502 include mobile phones, smart phones (e.g., iPhones®), tablet devices (e.g., iPads®), smart televisions, smart appliances, and other similar electronic devices that communicate via a telecommunication network. Each user equipment 502 unit may include a software client application that enables interaction between a subscriber and the user equipment 502 and the mobile application server 508. The software client may also implement business functionality and/or may be configured to perform Web 2.0 style mashups. The software client may be designed specifically for a particular type of user equipment 502.

The web application server 506 may be a third party web server that provides additional business logic and/or presentation layer functionality for subscribers.

The presentation layer engine 510 may be configured to expose a public interface of the mobile application server 508 to the user equipment 502 and/or web application server 506. The presentation layer engine 510 may be configured to apply business logic and/or perform data manipulation operations on the information received from the mobile application server 508, user equipment 502, or web application server 506, and/or to present information (e.g., through a firewall and/or network address translation unit) to the user equipment 502 or web application server 506 in a format that is readily usable by the user equipment 502 and/or the web application server 506. In an embodiment, the presentation layer engine 510 may be configured to tailor the information to a particular type of client (e.g., Type 1, Type 2, etc.), as opposed to a particular subscriber. For example, the presentation layer engine 510 may be configured to include additional navigational meta-information into messages sent to smart televisions since their user-interfaces may be more limited, such as to only permitting "up", "down", "left", "right", and "ok" user interface buttons, compared to the multi-touch user interface available on most smartphones and tablet devices.

The presentation layer engine 510 may support plug-ins that extend the presentation layer functionality with client device type-specific functionality, which may be added at run-time without shutting down the system. In the example illustrated in FIG. 5, the presentation layer engine 510 includes two device type extensions 512a, 512b. Each device type extension component 512a, 512b may be a plug-in that extends the functionality of the presentation layer engine 510 to include functionality specific to a particular type of user equipment. That is, the device type extension 512a may extend the functionality of the presentation layer engine 510 to support a first type of device (i.e., type 1 devices), and the device type extension component 512b may extend the functionality of the presentation layer engine 510 to support a second type of device (i.e., type 2 devices).

The mobile application server ("MAS" in FIG. 5) 508 may include (or communicate with) a subscriber management component 514, a user equipment policy enforcement engine 516, an analytical engine component 518, a decision core engine component 520, a caching engine 522, a notification engine 524, and other similar components. The mobile application server 508 may be software that operates within the telecommunications operator's network and/or a cloud computing environment. The mobile application server 508 may be implemented in a standalone server, or may be implemented as part of another functional component, such as in a policy controller. In an embodiment, the mobile application server 508 may be implemented as part of a policy and charging enforcement function component (e.g., PCEF 114 illustrated in FIG. 3 and FIG. 4). In various embodiments, the mobile application server 508 may be a subscriber engagement engine (SEE) or a customer interaction gateway (CIG). The mobile application server 508 may be stateless and/or otherwise configured to facilitate horizontal scalability. In an embodiment, the mobile application server 508 may be deployed in a cloud computing environment.

The mobile application server 508 may configured to expose a public interface (e.g., RESTful, SOAP, etc.) to which clients (e.g., device specific software applications installed on user equipment) may connect and communicate information. The mobile application server 508 may expose internal interfaces for establishing connections to other components, such as policy management systems (e.g., PCRF 116), charging systems (e.g., OCS 120, OFCS 118), and subscriber repositories (e.g., SPR 122). In various embodiments, the mobile application server 508 may expose a Gx interface for communicating with a policy charging rules function (e.g., PCRF 116), a Gy interface for communicating with an online charging system (e.g., OCS 120), a Gz interface for communicating with an offline charging system (e.g., OFCS 118), and/or an Sp interface for communicating with a subscriber repository (e.g., SPR 122).

As mentioned above, the mobile application server 508 may include a subscriber management component 514 or software module. The subscriber management component 514 may be configured to manage and maintain information relating to the subscribers associated with the user equipment 502, such as device specific settings. Additionally, the subscriber management component 514 may be configured to retrieve information from other components within the telecommunications operator's network.

The mobile application server 508 may include a user equipment policy enforcement engine 516 software module configured to convert, or compile, high-level policy requirements into low-level policy rules. In an embodiment, the user equipment policy enforcement engine 516 may be configured to generate the low-level policy rules specific to a particular type of user equipment (e.g., Type 1, Type 2, etc.). The low-level policy rules may be sent to the user equipment 502 for enforcement by the software client.

The mobile application server 508 may include an analytics engine 518 software module configured to record and provide basic logging and statistical information relating to user equipment 502 accessing the mobile application server 508. Additionally, the analytics engine 518 may be configured to use logging information in conjunction with additional contextual information obtained from other components within the telecommunications operator's network to generate semantically aware information.

The mobile application server 508 may include a decision core engine 520 software module configured to receive multiple inputs from multiple sources and produce a unified output. The inputs may contain stimuli information from the user equipment 502 as well as contextual information obtained from other components within the telecommunications operator's network (e.g., user equipment policy enforcement engine 516, etc.). The decision core engine 520 may generate the output to contain resulting data and/or calls to other functional components (e.g., the notification engine 524).

The mobile application server 508 may include a caching engine 522 or software module configured to cache information within the mobile application server 508. The cached information may relate to policy information, charging information, or any other subscriber or system information. The caching engine 522 may use customized caching algorithms that are application aware, so that it may preemptively cache data based on the subscribers' past actions, their probable future actions, and any other relevant contextual information. For example, in an embodiment, the caching engine 522 may be configured to use different caching algorithms for caching a subscriber's balance based on whether the subscriber's active charging is event based charging or session based charging. The caching engine 522 may also be configured to use traditional generic caching techniques in addition to the techniques discussed above.

The mobile application server 508 may include a notification engine 524 or software module configured to generate and send messages to the user equipment 502 for rendering in a device specific manner. The messages may be generated so that they may be rendered in the user equipment 502 using either a built-in operating system of the user equipment 502 or the software client running on the user equipment 502. The notification engine 524 may be configured to select a notification mechanism on a case-by-case basis, depending on the subscribers' preferences and their user equipment 502 types. The notification engine 524 may be configured to generate messages so they are specifically tailored to be presented on the subscriber's user equipment type (e.g., Type 1, Type 2, etc.). The notification engine 524 may be configured to generate the messages so that they are consistent with the location of the subscriber (e.g., written in a particular language and using relevant currency and currency formats, etc.).

In an embodiment, the notification engine 524 may be configured to implement notification policies, such as policies relating to the frequency at which notifications are to be sent (e.g., once per day, once per week, etc.), policies set by telecommunications operators, policies set by subscribers, etc. In various embodiments, the policies for sending notifications implemented by the notification engine 524 may be mandatory policies (e.g., required for the system), user-definable policies, and/or subscriber configurable policies. In an embodiment, the notification engine 524 may receive policies from a policy management system 530.

In an embodiment, the notification engine 524 may be configured to retrieve subscriber information from a subscriber repository. If a subscriber has multiple user equipment devices 502, the notification engine 524 may send notifications to the most appropriate device (which may be determined based on information retrieved from the subscriber repository) rather than spamming all of the subscriber's devices.

In an embodiment, the notification engine 524 may be configured to expose a public application programming interface (API) to components outside of the mobile application server 508. The system 500 may be configured such that there is a charge associated with the use of the public API by third parties. The system 500 may also be configured such that policies set by subscribers dictate which third parties may use the public APIs to communicate with specific user equipment 502.

Notifications sent by the notification engine 524 may include policy information, charging information, or any information relating to the subscriber (e.g., thresholds, balances, roaming charges, etc.). In an embodiment, the notification engine 524 may communicate with external resources to receive information relevant to the notifications. In an embodiment, the notification engine 524 may be part of a policy charging control system (e.g., PCC system illustrated in FIGS. 3 and 4).

The mobile application server 508 may communicate with a single sign on (SSO) system component 526, an AAA system component 528, a policy management system component 530, a charging system component 532, and other similar systems, such as a billing system, an external charging system, a profile manager system, and/or other components of the telecommunications service provider network.

The mobile application server 508 may communicate with the single sign on (SSO) system component 526 to authenticate subscribers and/or user equipment 502. The single sign on (SSO) system component 526 may be configured to enable the subscribers associated with the user equipment 502 to automatically identify and authenticate themselves to third party web applications. The single sign on server may also be configured to enable each subscriber to have multiple different identities, and to automatically select the correct identity based on the subscriber's preferences.

The mobile application server 508 may communicate with the AAA system component 528 to identify and authenticate user equipment 502, as well as to provide any authorization and access control management functionally required by the communications network or the system 500.

The mobile application server 508 may communicate with the policy management system component 530 to determine policies regarding usage of the telecommunications operator's network. These policies may be mandated by the telecommunications operator, or they may be selected and configured by the subscribers (e.g., via the client software on the user equipment 502). In an embodiment, communications between the policy management system component 530 and the mobile application server 508 may be achieved via the Gx interface. In the preferred embodiment of a 3G network, the policy management system component 530 may be a policy and charging rules function (PCRF) component.

The mobile application server 508 may communicate with the charging system component 532 to access and/or modify balance information. For example, the charging system component 532 may be invoked by the mobile application server 508 (e.g., via client software on the user equipment 502) in order to retrieve and/or modify subscribers' balances, such as to increment a subscriber's balance due to the subscriber having purchased more credit, or to decrement a subscriber's balance due to the subscriber's purchase of an additional service. In an embodiment, communications between the charging system component 532 and the mobile application server 508 may be achieved via the Gy interface. In the embodiment of a 3G network, the charging system may be an online charging system (OCS).

In an embodiment, the mobile application server 508 may be a customer interaction gateway. The customer interaction gateway may optionally be located behind a Firewall and a Network Address Translation (NAT) device. The customer interaction gateway may interact with the user equipment 502 in order to pass and receive information. The customer interaction gateway may push various types of information to the user equipment, such as information relating to rating plans, balance information, loyalty information, subscriber policies and subscriber profile information. The customer interaction gateway may also communicate with the other elements in the operator's core such as the policy management system (e.g. PCRF in a 3GPP network), a charging, rating and balance management system (e.g. an OCS or OFCS in a 3GPP network), a subscriber repository (e.g. an SPR or UDR in a 3GPP architecture), or a loyalty management system. The customer interaction gateway may also be configured to perform management operations to filter the information going to/from the user equipment 502. For example, if the customer interaction gateway sends a message that enables a subscriber to purchase an additional service (such as a bandwidth boost), the customer interaction gateway may be configured to block sending messages offering services previously offered to the subscriber (e.g., in the past 24 hours).

In an embodiment, the mobile application server 508 may be configured so that the interfaces between the mobile application server 508 and user equipment 502 are stateless (enabling extremely fast and scalable communications) and so that the interfaces between the mobile application server 508 and other components in the telecommunications operator's network (e.g., charging system 532) are stateful (enabling the components to maintain active sessions for prolonged periods of time).

Figure 6:
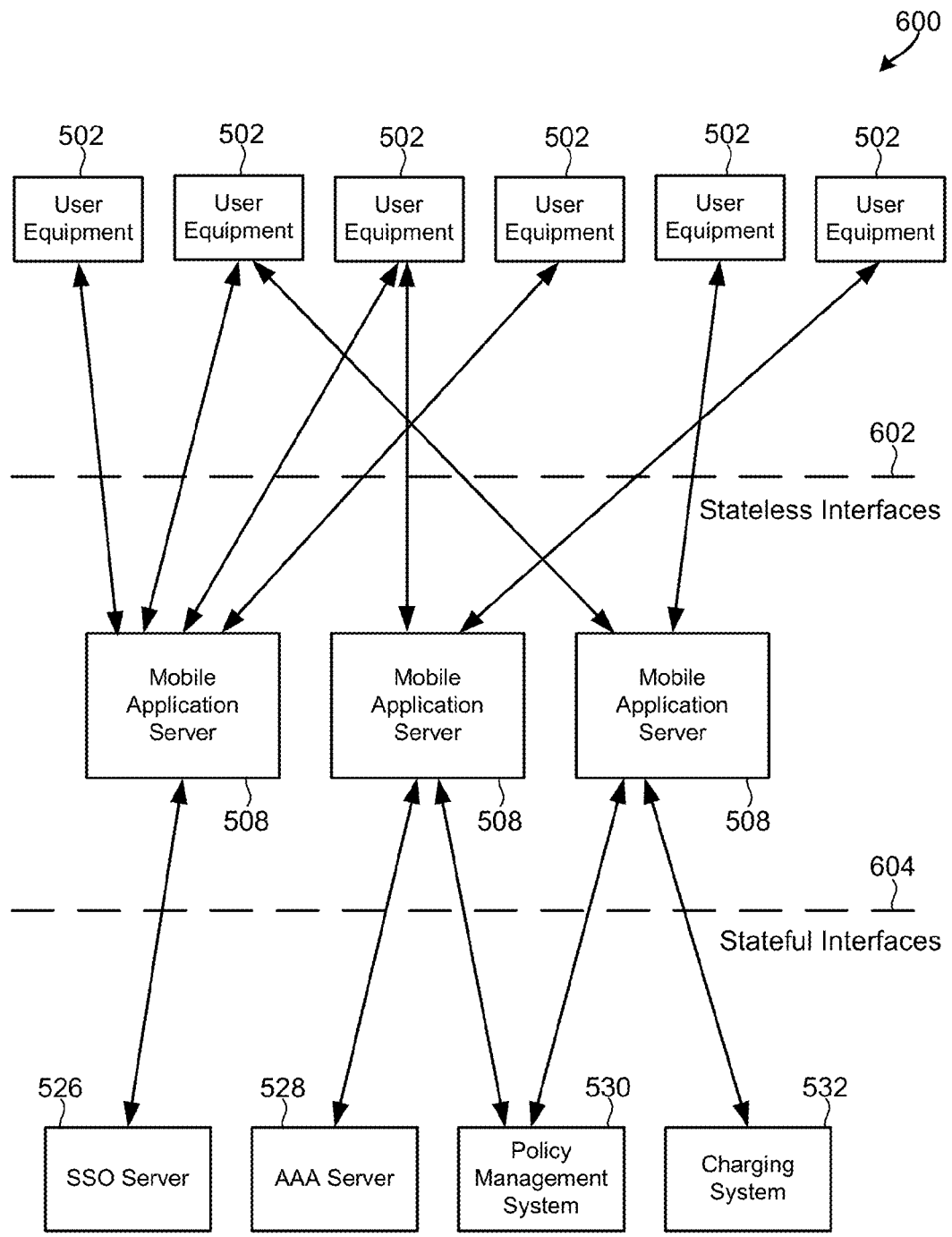
FIG. 6 is a network architectural diagram illustrating logical components, information flows and interfaces in a communication system including both stateless and stateful interfaces in accordance with an embodiment.

FIG. 6 illustrates logical components, information flows and interfaces in a communication system 600 including both stateless and stateful interfaces in accordance with an embodiment. Specifically, FIG. 6 illustrates that the communication system 600 may include a plurality of user equipment devices 502, each of which may communicate with one or more of a plurality of mobile application servers 508 via one or more stateless interfaces 602. The mobile application server 508 may communicate with a single sign on (SSO) system component 526, an AAA system component 528, a policy management system component 530, and a charging system component 532 and the other internal components within the telecommunications operator's network via stateful interfaces 604 that enable the component to maintain active sessions for prolonged periods of time.

Figure 7:
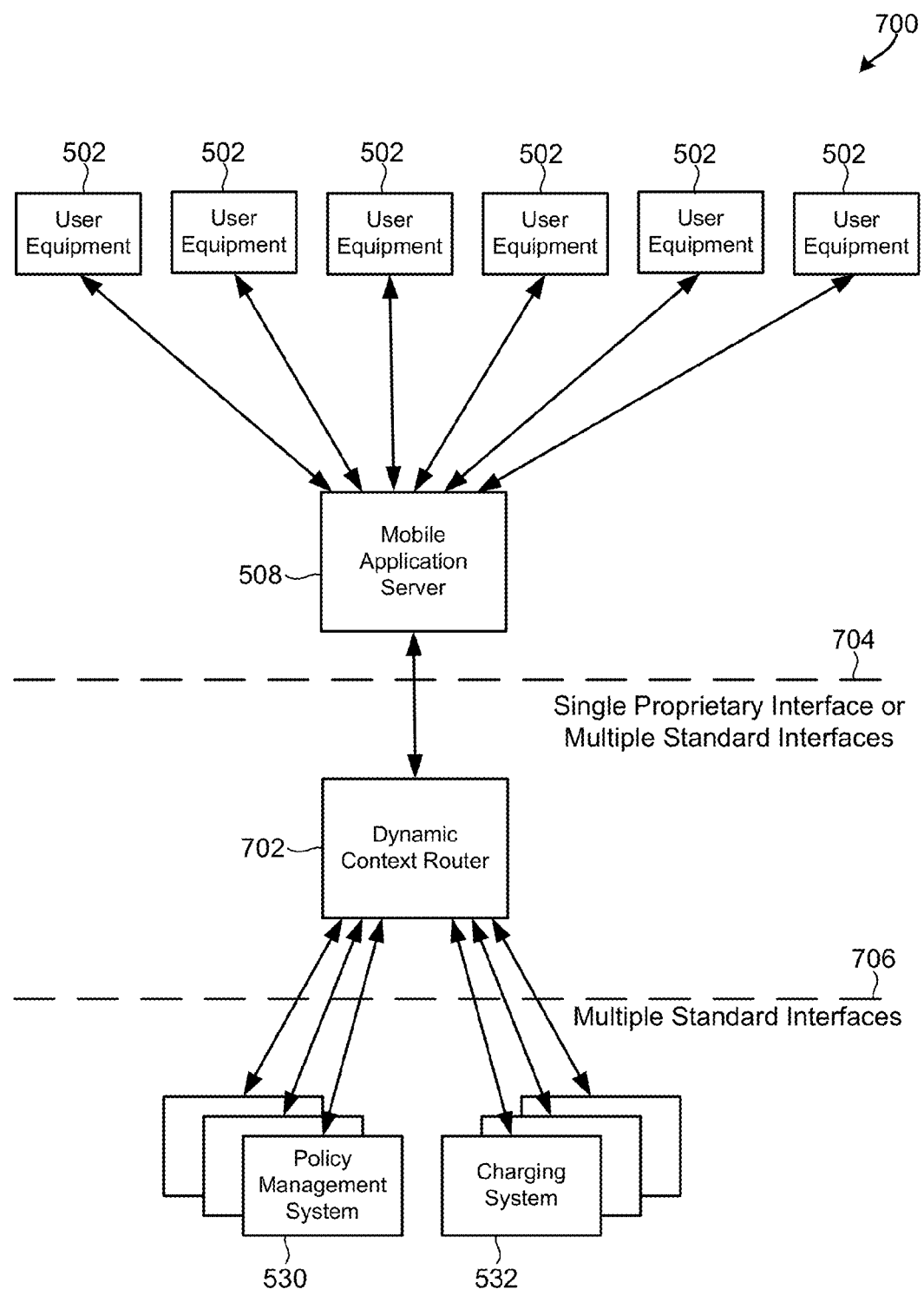
FIG. 7 is a network architectural diagram illustrating logical components, information flows and interfaces in an embodiment communication system in which communications between mobile application servers and policy and charging components are facilitated by a dynamic context router (DCR).

FIG. 7 illustrates logical components, information flows and interfaces in an embodiment communication system 700 in which communications between mobile application servers and policy and charging components are facilitated by a dynamic context router (DCR) 702. The communication system 700 may include a plurality of user equipment devices 502, each of which may communicate with a mobile application server 508. The mobile application server 508 may communicate with multiple policy management system components 530 and multiple charging system components 532 via a dynamic context router (DCR). The dynamic context router 702 is a flexible, protocol agnostic, application-level router and load balancer that may be used to manage communications between various instances of various components (e.g., charging system 532, etc.) in the system 700 to ensure that the correct messages are sent to the correct instances. Additional details of the dynamic context router 702 may be found in U.S. patent application Ser. No. 13/309,008 filed Dec. 1, 2011, titled "Methods, Systems and Devices for Dynamic Context-Based Routing," the entire contents of which are incorporated by reference.

Briefly, the dynamic context router 702 may be an extension of a diameter routing agent (DRA) defined by the 3GPP standards (e.g., provide the functionality attributed to a DRA), but configured to perform operations for implementing many features and functions not provided by a DRA. For example, the dynamic context router 702 may identify communication partners and/or determine resource availability, determining the identity and availability of communication partners for an application requesting a communication session, make routing and load-balancing decisions dynamically based on the context and content of the information being communicated, look inside the messages being communicated and make intelligent decisions based on the content of the messages, make calls to external systems requesting additional information for a specific message being communicated, and many other operations.

Returning to FIG. 7, the mobile application server 508 may communicate with the dynamic context router through one or more interfaces 704, which include a single proprietary interface or multiple standardized interfaces. The dynamic context router 702 may interface with multiple policy management systems 530 and multiple charging systems 532 using multiple standardized interfaces 706. In an embodiment, the communication system 700 may include multiple instances of the dynamic context router 702.

Figure 8:
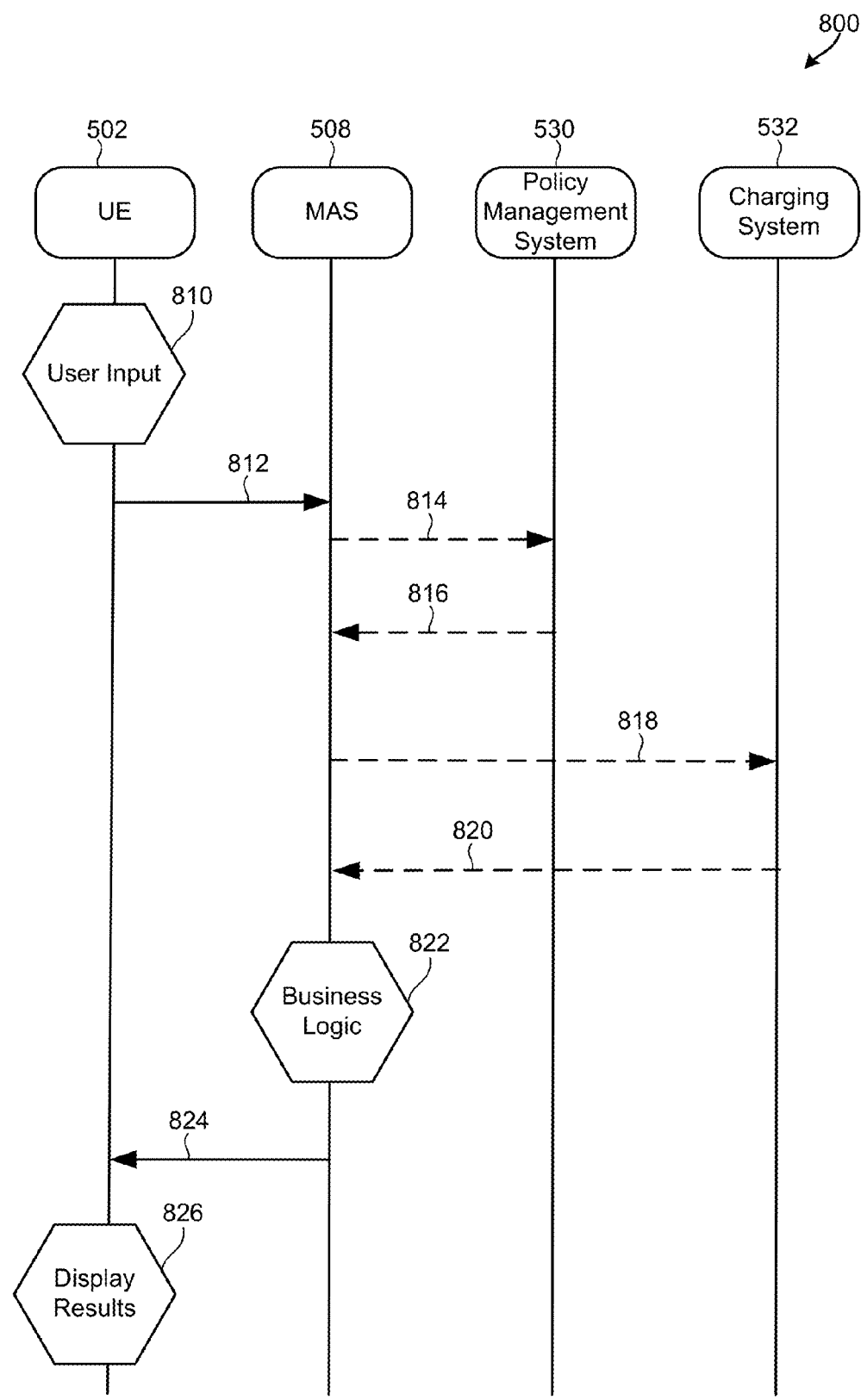
FIG. 8 is a message flow diagram illustrating message flows in a communication system that includes a mobile application server in accordance with various embodiments.

FIG. 8 illustrates logical components and example message flows in a communication system 800 that includes a mobile application server 508 in accordance with various embodiments. The illustrated communication system 800 includes a user equipment component 502, a mobile application server 508, a policy management system component 530, and a charging system component 532. In block 810, a subscriber may interact with the client software on his/her user equipment component 502. The user equipment 502 may send a request message 812 to the mobile application server 508 for information (e.g., policy and/or charging information, etc.) regarding the subscriber.

In response to receiving a request message 812, the mobile application server 508 may determine whether the required policy and/or charging information is available locally. If the mobile application server 508 determines that the policy information required to fulfill the request message 812 is not available locally, the mobile application server 508 may send a request message 814 to the policy management system component 530 requesting the required additional policy information, and the policy management system component 530 may send a response message 816 that includes the requested policy information to the mobile application server 508. Likewise, if the mobile application server 508 determines that the charging information required to fulfill the request message 812 is not available locally, the mobile application server 508 may send a request message 818 to the charging system component 532 requesting additional charging information, and the charging system component 532 may send the mobile application server 508 a response message 820 that includes the requested charging information.

As mentioned above, above, the mobile application server 508 may have all of the required charging information available locally due to techniques such as caching. If the mobile application server 508 determines that the required policy and/or charging information is available locally (e.g., via caching or messages 816, 820), in block 822, the mobile application server 508 may use the policy and/or charging information to perform business logic operations specific to the request and/or user equipment 502, and send the results of the operations and/or the requested response 824 to the user equipment 502. In block 826, the user equipment 502 may analyze the received information and display the results to the subscriber.

The mobile application server 508 may be configured to support a number of different use cases by, for example, retrieving and analyzing subscriber, policy, and charging information and sending the results to the user equipment. Use cases may include built-in use cases that are ready for immediate consumption by the end user (e.g., the network subscriber) and definable use cases that may be defined by telecommunications operators as they are needed. A subscriber may customize the use cases by interacting with the mobile application server 508 through a user interaction system (e.g., a graphical user interface) on the user equipment 502. Examples of use cases that may be supported by the various embodiments include use cases relating to policy, charging, harassment prevention, subscriber level restrictions, service level restrictions, account level restrictions, roaming controls, spending limits, notifications, roaming services, content filtering (e.g., parental control to prohibit certain types of content under certain conditions), uniform resource locator whitelists, uniform resource locator blacklists, modem detection (e.g., tethering), bill shock prevention, domestic controls, international controls, fixed duration service passes, periodic passes (e.g., day pass, week pass, etc.), single or recurring use controls, prepaid subscriber accounts, postpaid user accounts, bandwidth controls, on demand services, real-time promotions, real-time discounts, network utilization, network congestion, personalized spending limits, notifications, rolling spend notifications (e.g., 80%, 100%, 180%, 200%, etc.), thresholds, account overview, current spending, current balances, spending per service, status of bundles, service breakdowns, detailed billable records, total amounts per classification, address book resolution, live usage, counting automatically started with first data session, loyalty, rewards, current subscription plans, alternative subscription plans, tiered services based on bandwidth and usage requirements, currently installed add-ons, available add-ons, fair usage and quota management, excesses charges, free services, etc.

In an embodiment, the mobile application server 508 may be configured to communicate with both a policy management system 530 and a charging system 532 in order to automatically extract the use cases with which they have been configured, and then self provision itself with the information that supports the above-listed use cases. In an embodiment, the policy management system 530 and the charging system 532 may be configured to support the exporting of information supporting the above-listed use cases in a semantically meaningful way by using a meta-data model to describe the policy rules, charging rules, dictionaries, tables, counters, and/or any other required information.

FIGS. 9-12 illustrate user equipment devices configured with user interaction systems that provide a subscriber with access to information regarding his/her usage, charging, policy, service, subscription, account information and/or any other information relating to any of the use-cases listed above. The user interaction systems may communicate with the mobile application server 508 and/or perform computations via client software installed on the user equipment. The user interaction systems may access the charging system 532, the policy management system 530, or other network components via the mobile application server 508. For example, a user interaction system may be configured to access an online charging system (e.g., OCS 120) via the mobile application server 508 to retrieve charging information that may be used in conjunction with other information (e.g., usage information available to the user equipment 502, etc.) to present the subscriber with more in-depth information or services (e.g., top 10 most expensive list, etc.). The user interaction system may also be configured to receive and display notifications (e.g., from a notification engine/server and/or the mobile application server) in the form of application information, widget information, status indicators in a title bar, etc. The user interaction system may display the information in terms of data quantities, costs, allowances, percentages, etc.

Figure 9:
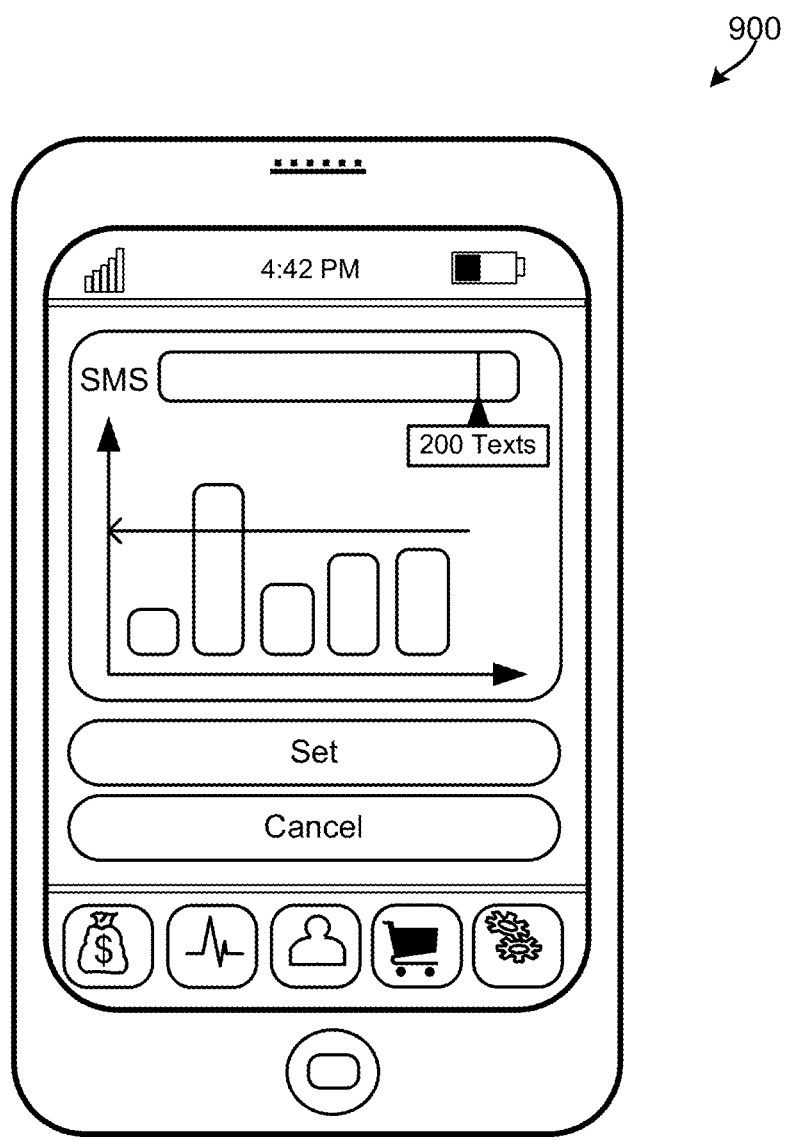
FIGS. 9-28 are illustrations of user equipment devices displaying user interaction systems configured to provide subscribers with access to detailed usage, charging, policy, service, subscription and/or account information in accordance with various embodiments.

FIG. 9 illustrates an interaction system 900 configured to provide a subscriber with access to information regarding his/her short message service (SMS) usage and set SMS usage thresholds in accordance with an embodiment. In this embodiment, the user equipment may be configured to access usage and threshold information via the mobile application server 508, and present the information on the user interaction system 900 in an easy to understand format. The embodiment may further include various user interface icons that, when touched or actuated, cause the device to send various types of information to the mobile application server 508, which may adjust the subscriber's information/settings accordingly.

Figure 10:
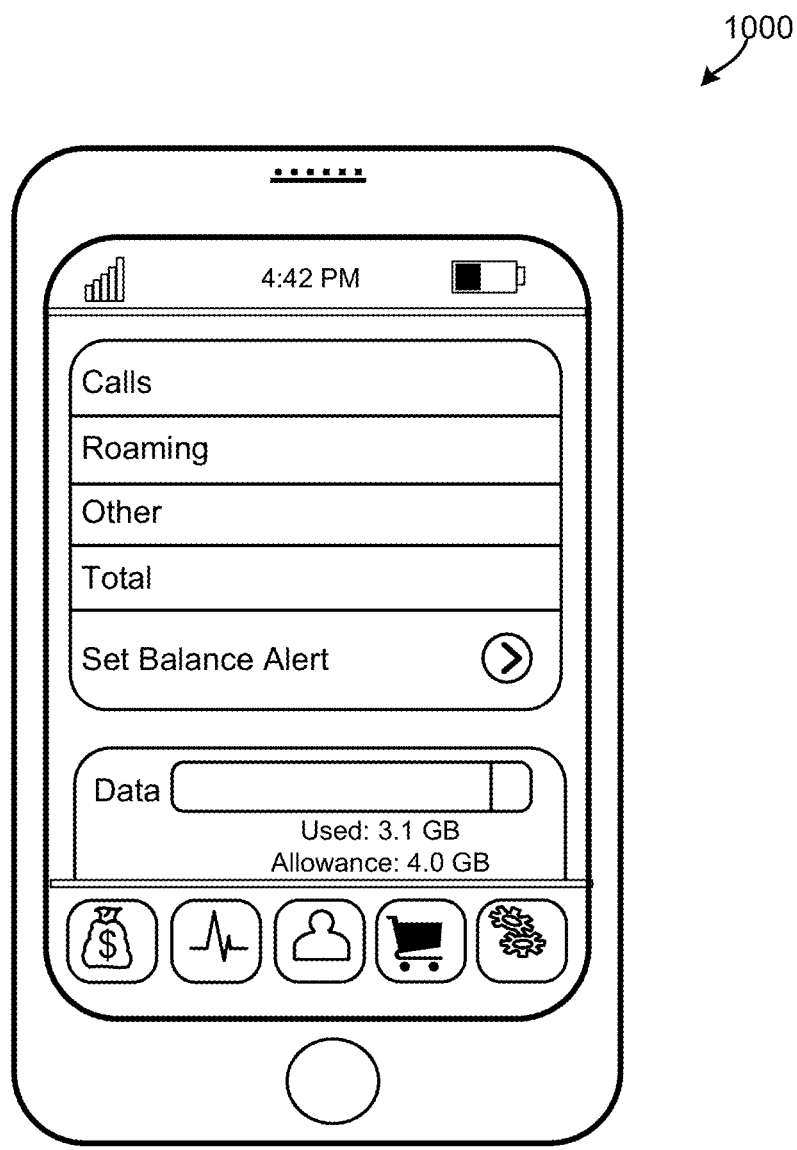

FIG. 10 illustrates an interaction system 1000 configured to enable users to set balance alerts and provide users access to information regarding calls, roaming, data usage history, data usage allowance, and other similar information in accordance with another embodiment. In this embodiment, the user equipment may be configured to access information via the mobile application server 508, and present the information on the user interaction system 1000 in an easy to understand format. The embodiment may further include various user interface icons that, when touched or actuated, cause the device to send various types of information to the mobile application server 508, which may adjust the subscriber's information/settings accordingly.

Figure 11:
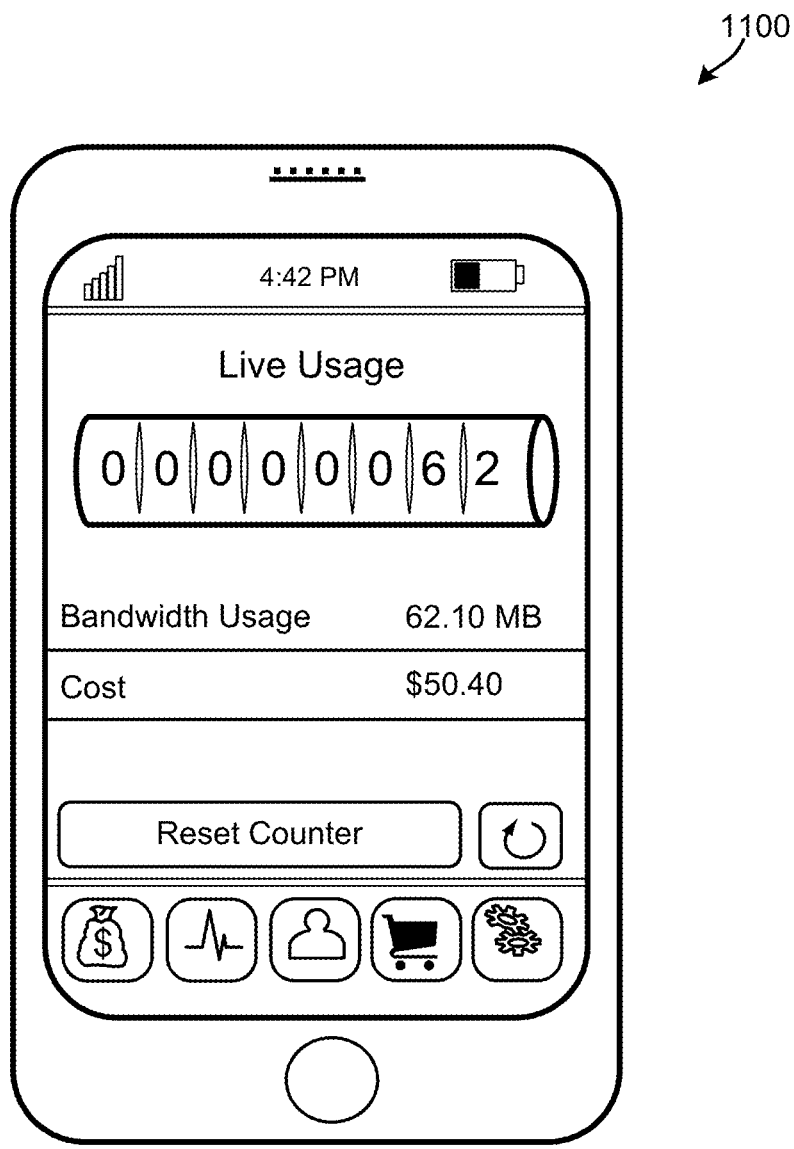

FIG. 11 illustrates an interaction system 1100 configured to provide users with live information regarding their usage and charging in accordance with yet another embodiment. In this embodiment, the user equipment may be configured to access information via the mobile application server 508, and present the information on the user interaction system 1100 in an easy to understand format. The embodiment may further include various user interface icons that, when touched or actuated, cause the device to send various types of information to the mobile application server 508, which may adjust the subscriber's information/settings accordingly.

Figure 12:
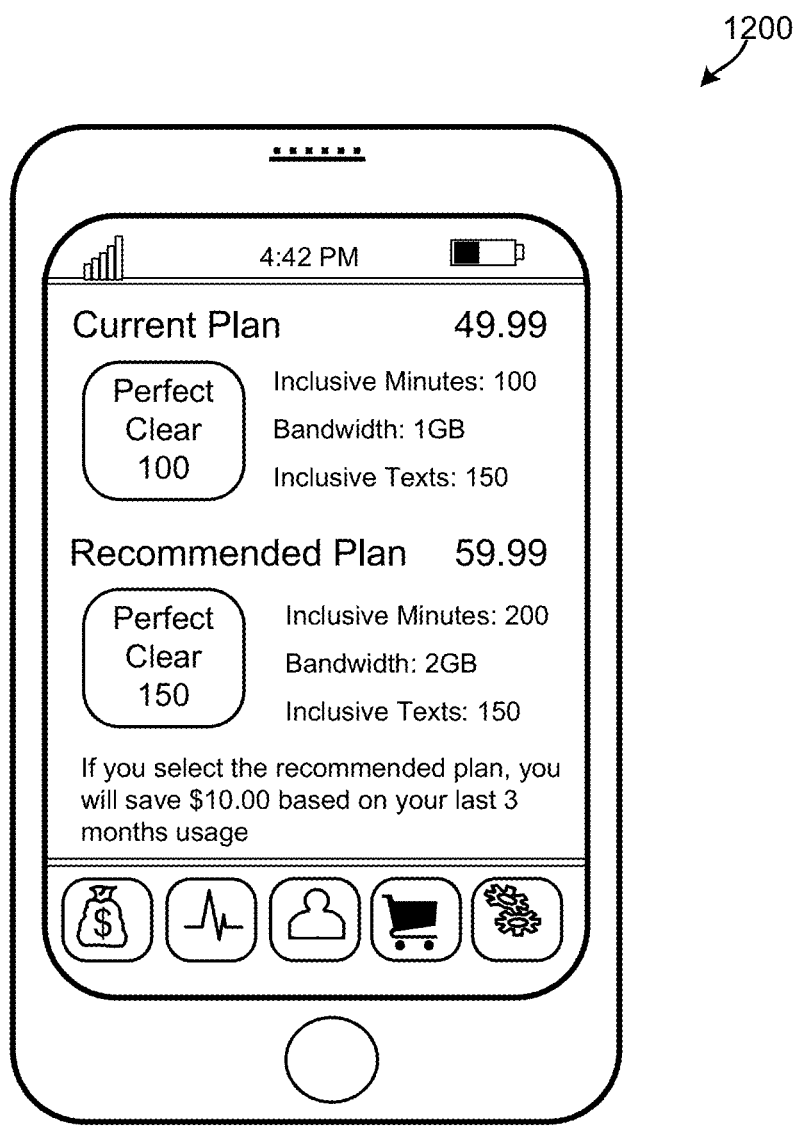

FIG. 12 illustrates an interaction system 1200 configured to provide users with information regarding a current subscription plan, and to recommend other subscription plans that the system determines to be more cost effective for the subscriber. In this embodiment, the user equipment may be configured to access information via the mobile application server 508, and present the information on the user interaction system 1200 in an easy to understand format. The embodiment may further include various user interface icons that, when touched or actuated, cause the device to send various types of information to the mobile application server 508, which may adjust the subscriber's information/settings accordingly.

In addition to the user interaction systems 900, 1000, 1100, 1200 illustrated in FIGS. 9-12, various embodiments may include other user interaction systems configured to provide users with any of the functionalities associated with one or more of the above-mentioned use cases, or other functionalities associated with policies and/or charging. In such embodiments, the user equipment may be configured to access information via the mobile application server 508, and present the information on the user interaction system in an easy to understand format. These embodiments may further include various user interface icons that, when touched or actuated, cause the device to send various types of information to the mobile application server 508, which may adjust the subscriber's information/settings accordingly.

Figure 13:
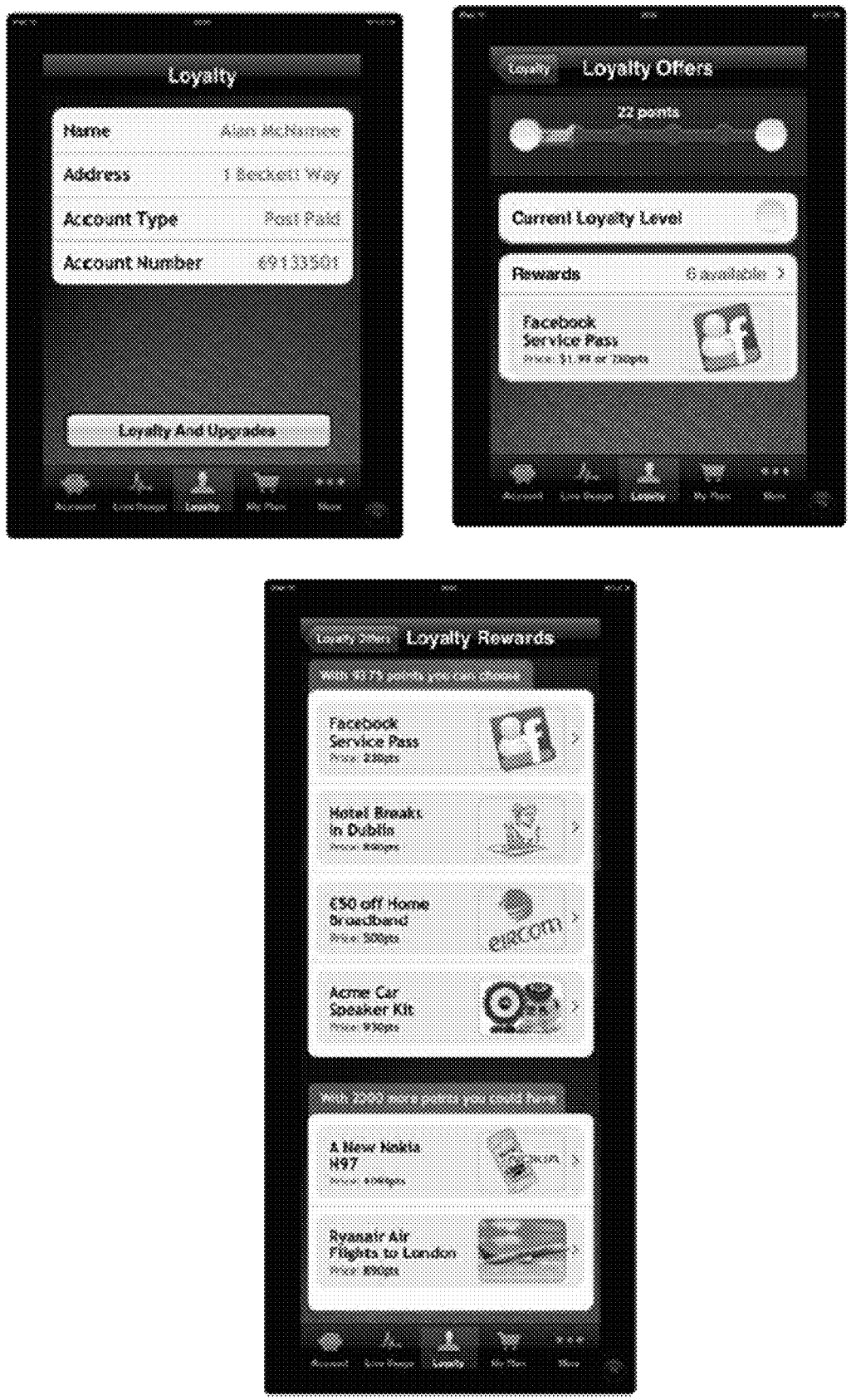

In an embodiment illustrated in FIG. 13, the user interaction system and the mobile application server 508 may be configured to support a loyalty rewards service. In this embodiment, the mobile application server 508 may be configured to retrieve information from network components (e.g., policy management system 530 and charging system 532), some of which may not be readily accessible to the telecommunication service providers. The user interaction system may be configured to display information for managing loyalty accounts (e.g., "points"), services (e.g., cashing in points), and information. For example, the user interaction system may be configured to display existing loyalty/reward points, entitlements based on current points (e.g., flights, hotel breaks, cinema tickets, additional services, cash back, etc.), entitlements based on additional points, and other similar information that is accessible through the mobile application server 508. The user interaction system may display an interface that allows the users to redeem rewards and/or donate points or entitlements to other users or a charity (e.g., as part of a good corporate citizenship program, etc.). The user interaction system may communicate with a loyalty server via the mobile application server 508 to provide subscriber selection information that the loyalty server may act on (e.g., to process a transaction using loyalty/reward points). The loyalty server may included as part of (or may communicate with) other loyalty systems (e.g., supermarket, airline, credit card, etc.).

Figure 14:

In an embodiment illustrated in FIG. 14, the user interaction system and the mobile application server 508 may be configured to support a harassment prevention service. In this embodiment, the user interaction system may be configured to prevent harassment on the user equipment 502 by, for example, enabling users to restrict or block incoming harassment communications from other users. The user interaction system may display an input screen that enables users to input (e.g., via selection, keyboard input, etc.) a number they desire to block or restrict. The user interaction system may present an input screen that enables users to input numbers, wildcards and/or other information for identifying a group or category of phone numbers (e.g., any number that starts with 1800, all unidentified numbers, any number not in a specified contacts list, etc.) that are to be blocked or restricted (e.g., allow calls from subscriber A, but not SMSs from subscriber A). The user interaction system may be configured so that numbers may be added via selection from an SMS inbox or a list of recent calls, which may be stored on a device memory or on a server accessible to the mobile application server 508. In an embodiment, the user interaction system may be configured to identify various communication details (e.g., time of call, duration of call, caller's number, content of the communication, etc.) and store the identified details separately in a protected memory of the user equipment or on a server memory accessible to the mobile application server 508 (e.g., a server within the core network) for safekeeping in case such details are needed (e.g., as evidence for legal proceedings) in the future.

Figure 15:

In an embodiment illustrated in FIG. 15, the user interaction system and the mobile application server 508 may be configured to support a parental/group controls service. In this embodiment, the user interaction system may be configured to enable users to set and manage parental and/or group controls for selected user equipment 502 or a group of user equipment 502. For example, the user interaction system may be configured to display an input screen that enables users to input information for grouping users into a category (e.g., family, co-workers, employees, business contacts, users subscribing to a common service plan, etc.). The user interaction system may present users with options for sharing a common balance (e.g., 400 texts per month for all of the phones grouped into the family category), reallocating balances (e.g., for users subscribing to a common service plan), split billing (e.g. into a personal balance and a corporate balance), and other similar options for accessing and/or modifying information relating to parental or group controls via the mobile application server 508. The user interaction system may also enable users to restrict access to information or services (e.g., block streaming videos on employee phones during work hours), specify which services are allowed per account (e.g., charges for data consumed using YouTube® are not to be charged to the corporate balance), filter content (e.g., block text messages that include pictures or a category of pictures), establish white and black lists, and perform other similar operations for restricting access to information or services. The user interaction system may present users with options for restricting communications between certain group members (e.g., coworker A may not send texts to coworker B during work hours) over which the subscriber has managerial control of subscriber accounts. The user interaction system may enable a subscriber to redirect content (e.g., SMSs, emails that include profanity, etc.) sent to a first phone (e.g., son's phone) to a second phone (e.g., dad's phone) or an external server or website. The user interaction system may enable a subscriber of the second phone (e.g., dad's phone) to receive and approve redirected content, in which case the content may be delivered to the first phone via the mobile application server 508.

Figure 16:

In an embodiment illustrated in FIG. 16, the user interaction system and the mobile application server 508 may be configured to support a "live usage" service that enables users to monitor and manage live usage of telecommunication and/or IP services. The user interaction system may display one or more subscriber-configurable live counters (e.g., counters for bandwidth, network speed, consumption costs, spend velocity, etc.), which may include controls that enable users to start, stop, pause, and reset the live counters. The user interaction system may display detailed billable records and/or enable users to tag costs. For example, the user interaction system may display an input screen that enables users to tag a specific telephone call as "work," and communicate with the mobile application server 508 to transfer costs (or cost information) associated with the identified call to a different account or billing category. The user interaction system may retrieve (via the mobile application server 508) and display a "Top 10" most expensive list identifying the ten most expensive calls or services consumed over a subscriber-selectable period (e.g., day, month, year, etc.).

Figure 17:
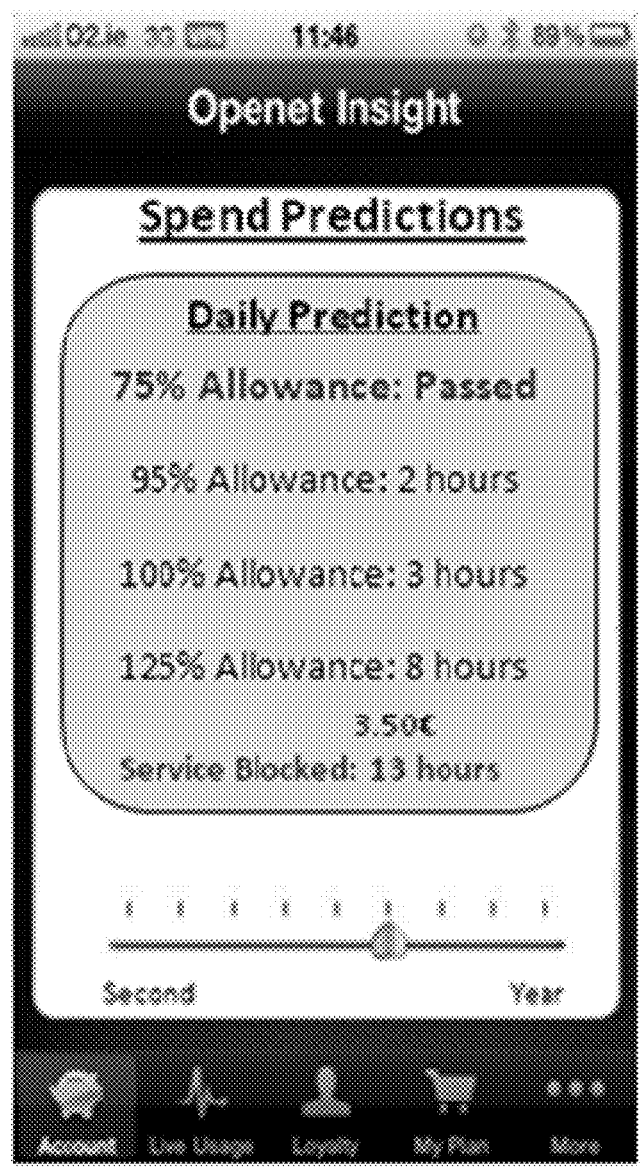

In an embodiment illustrated in FIG. 17, the user interaction system and the mobile application server 508 may be configured to support a "predicted usage" service in which future usage and costs may be predicted and displayed on an electronic display of the user equipment 502. The user interaction system may compute (e.g., via client software of the user equipment 502 or the mobile application server 508) predicted usage and/or cost information based on current and/or past usage information. The displayed information may be modeled on usage "velocity" and/or "acceleration," and the time periods associated with the displayed information may be subscriber-selectable and/or configurable (e.g., per second, minute, day, week, month, year, billing period, etc.). Current, past, and predicted future usage and cost information may be retrieved by the user equipment from the mobile application server 508.

Figure 18:

In an embodiment illustrated in FIG. 18, the user interaction system and the mobile application server 508 may be configured to support a "threshold notification" service. In this embodiment, the user interaction system may be configured to display usage threshold information and notify the users when the thresholds are breached. The user interaction system may display an input screen that enables users to set thresholds, and communicate with the mobile application server 508 to set the thresholds and/or request to receive notifications from the notification server 524 when a set threshold is crossed. The threshold information may relate to mandatory thresholds (e.g., thresholds set by the network operator) or arbitrary thresholds set or personalized by a subscriber. Received notifications may be added to a calendar application accessible to the user equipment 502 (e.g., via the user equipment software or the mobile application server 508). Thresholds set by the mobile application server 508 may trigger new policies to be enforced in a policy management system 530. The notifications and thresholds may be based on contextual information (e.g., a subscriber's daily thresholds may be significantly lower if the subscriber is roaming).

Figure 19:
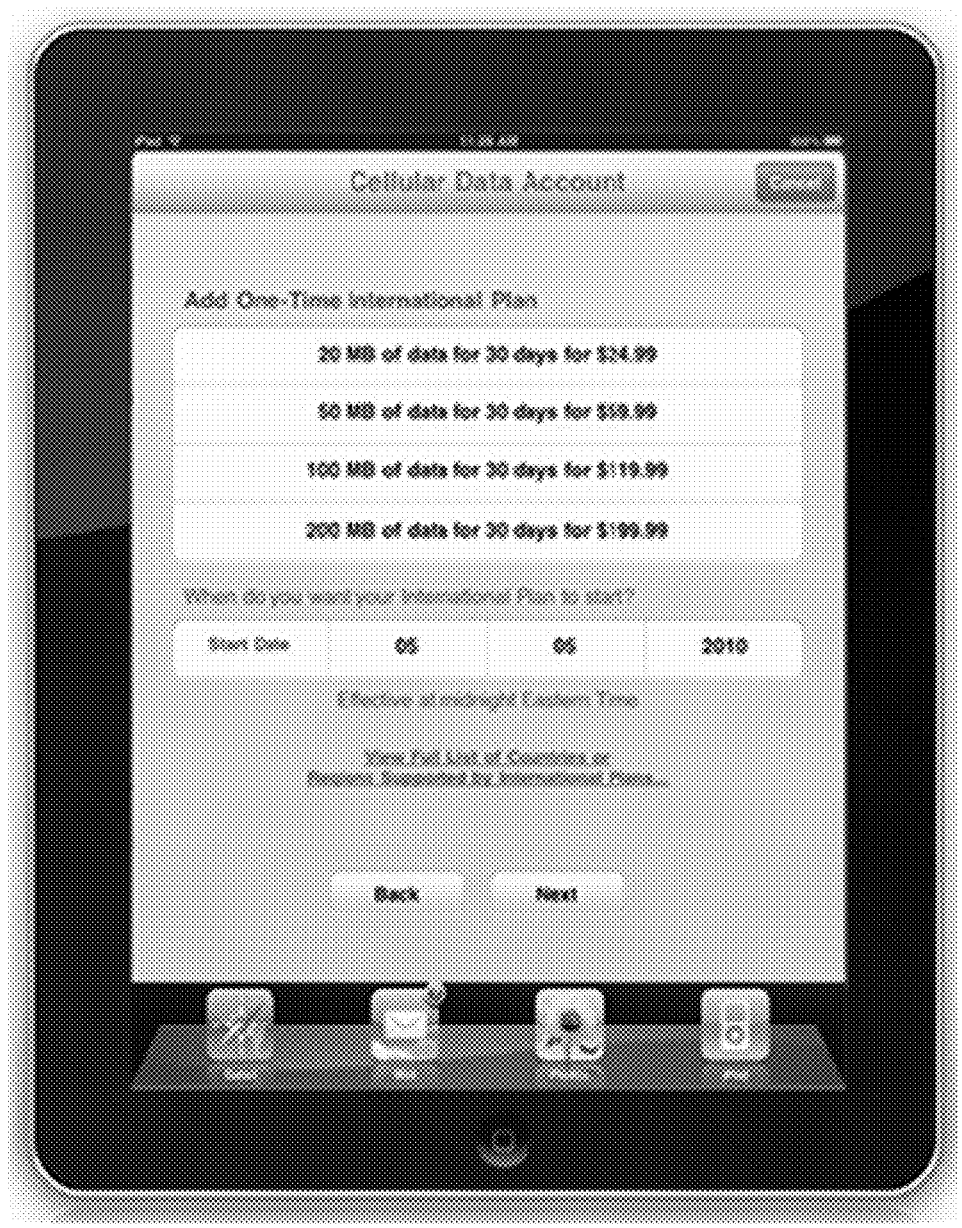

In an embodiment illustrated in FIG. 19, the user interaction system and the mobile application server 508 may be configured to support a "connectivity pass" service that enables users to purchase connectivity/services as they are required without establishing a long term relationship with the network operator, which may be achieved by the user equipment connecting to the telecommunications network through the mobile application server 508. The mobile application server 508 may be configured to enable third party providers to provide access to sponsored content for a reduced fee or for free. For example, a company (e.g., Apple®) may register with the mobile application server, Apple®) to enable selected user equipment to access a site or service (e.g., Apple® App Store) through the mobile application server 508 at no cost to the subscriber. The user interaction system may display an input screen that enables users to purchase (via the mobile application server 508) a service or connectivity that most suits the user's needs (e.g., voice only, SMS, Internet, etc.). The user interaction system may display an input screen that enables users to pay for the connectivity directly using a credit card. Users may be presented with the option of purchasing connectivity passes having various predetermined durations (e.g., 24 hour pass, 7 days pass, 1 month pass, etc.). The user interaction system may display an input screen that enables a user who is a pre-paid customer to top-up (increase) his/her balance or time on the connectivity pass using his/her credit card or an external system (e.g., an online baking portal). The user interaction system may add details of the connectivity pass (e.g., start date, end date, etc.) to a user calendar.

Figure 20:
Figure 20:
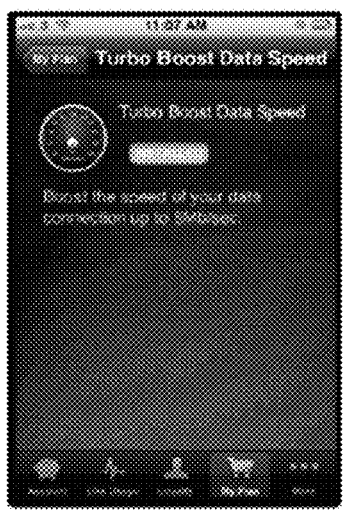
Figure 20:
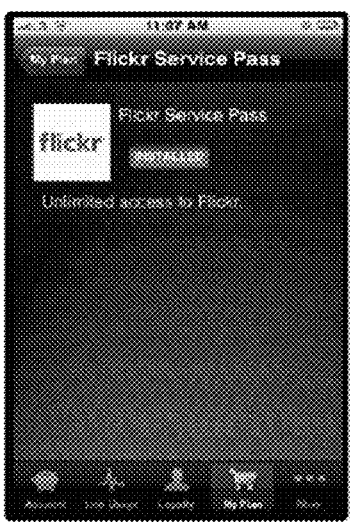

In an embodiment illustrated in FIG. 20, the user interaction system and the mobile application server 508 may be configured to support a service pass purchase functionality that enables users to buy additional services. The user interaction system may display currently installed service passes, available service passes and self-provision service passes. The mobile application server 508 may send the user interaction system targeted service passes, which may be targeted to the subscriber based on his/her previous or current actions and/or based on contextual information. For example, a subscriber having exceeded a 90% threshold for a service may be offered a service pass that doubles the previous allowance for that service. As another example, a subscriber who is roaming may be offered a roaming-related service pass. As yet another example, the services may be targeted to a subscriber based on similar groups or categories of users (e.g., same age, gender, monthly spending habits, services, etc.) purchasing the same service passes. The user interaction system may add details of the service pass (e.g., start date, end date, etc.) to a user calendar.

In an embodiment, the user interaction system and the mobile application server 508 may be configured to support a quality of service (QoS) testing service or capability that enables subscribers to self-test a current level of quality of service on their user equipment. The user interaction system may be configured to display an input screen displaying a "Test QoS Now" button or icon that, when touched or actuated, causes the user equipment 502 to send various types of information to the mobile application server 508, which may measure various QoS parameters (e.g., uplink, downlink, bandwidth, jitter, etc.) and report the measured information back to the user equipment. The mobile application server 508 may instruct the policy management system 530 to temporarily block all other traffic to ensure an accurate test. The mobile application server 508 may instruct the charging system 532 to "zero rate" the test traffic. The mobile application server 508 may generate data and send the generated data to the client software or user equipment. Likewise, the client software or user equipment may also generate data and send the generated data to the mobile application server 508 to disable all other services and cause all of the data to be created and terminated within the same network, thereby improving the accuracy of the test (unlike Internet based tests that are dependent on other networks). The mobile application server 508 may send the results of the test to the user equipment 502, which may receive and store the test results, compare the received test results with previous test results and/or expected results. The user interaction system may display the test results on an electronic display of the user equipment.

In an embodiment, the user interaction system and the mobile application server 508 may be configured to support a "dynamic pricing" service or functionality that enables the network operator to vary the pricing of services based on network activity. The mobile application server 508 may generate and send the user interaction system targeted dynamically priced offers in the form of service passes and/or notifications (e.g., via the notification engine 524), and the user interaction system may notify the subscriber of the availability of a dynamic pricing offer. The mobile application server 508 may generate the targeted dynamically priced offers based on the subscriber's preferences, which may be specified via the user interaction system (e.g., via selection of an "I always want to be notified of dynamic pricing offers" option). The mobile application server 508 may be configured to increase pricing during times of high volume traffic or network congestion to discourage usage. The mobile application server 508 may also be configured to generate dynamically priced offers to discourage usage. For example, the mobile application server 508 may access the policy management system 530 to detect that a subscriber is trying to access a service (e.g., video-on-demand service) during peak hours, and generate a dynamically priced offer that includes a free hour of access if the subscriber delays accessing the service until after peak hours. The mobile application server 508 may also generate dynamically priced offers based on perishable services and/or underutilized resources. For example, the mobile application server 508 may generate a dynamically priced offer that allows a subscriber to access a service (e.g., video-on-demand service) for a fraction of the normal price if he/she does so during off-peak hours, in certain geographical areas, during a particular time of day, week, etc.

Figure 21:
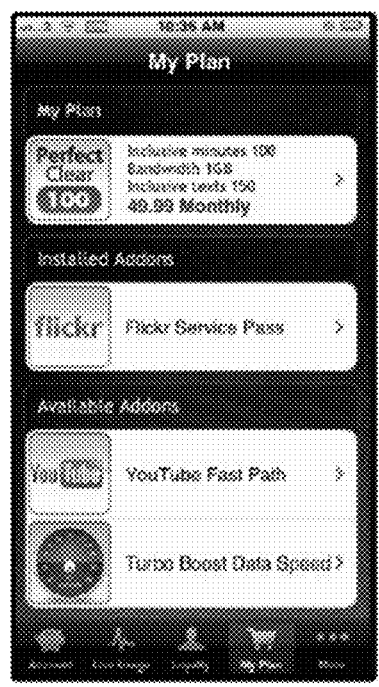
Figure 21:

In an embodiment illustrated in FIG. 21, the user interaction system and the mobile application server 508 may be configured to support a personalized service plan option that enables a subscriber to determine how the monthly subscription will be divided between different services. The user interaction system may display details of a subscriber's current plan and enable the subscriber to tailor the allocation between services (e.g., voice, SMS, Internet, etc.). The user interaction system may further enable the subscriber to tailor the allocation between application level and/or Internet services, such as email, web browsing, video-on-demand, etc. The user interaction system may enable the subscriber to change the allocation at any time during the month after viewing his/her live usage information. The user interaction system may send information relating to the subscriber's selections and/or allocations to the mobile application server 508 for implementation.

In an embodiment, the user interaction system and the mobile application server 508 may be configured to support a context based promotion service that enables a subscriber to receive promotions based on a context relating to the subscriber. The mobile application server 508 may enable third parties to submit context-based promotions for use with a network operator/service provider. The context-based promotions may relate to a location (e.g., enter a promotional code at the airport to get 5 free SMS messages at your destination, scan a barcode on the way into a concert to get 10 free photo uploads, etc.). The mobile application server 508 may also enable network operators/service providers to submit context-based promotions for use with a third party (e.g., eTicket that enables free entry to a museum, etc.).

In an embodiment, the user interaction system and the mobile application server 508 may be configured to support a "live advice of charge" service that enables a subscriber to determine the charge associated with a specific service under specific circumstances before he/she consumes the service. The user interaction system may display an input screen that enables users to enter "what-if" scenarios (e.g., How much will it cost me if I make a 10 minute call to a Canadian landline right now?, How much will it cost me if I watch a 90 minute film online now?, etc.). The user interaction system may send information relating to the subscriber's selections and/or allocations to the mobile application server 508 for analysis, and display the results of the analysis on an electronic display of the user equipment. The user interaction system may enable users to enter "what-if" scenarios that account for context, time of day, location (roaming or not), network access type, etc.

Figure 22:
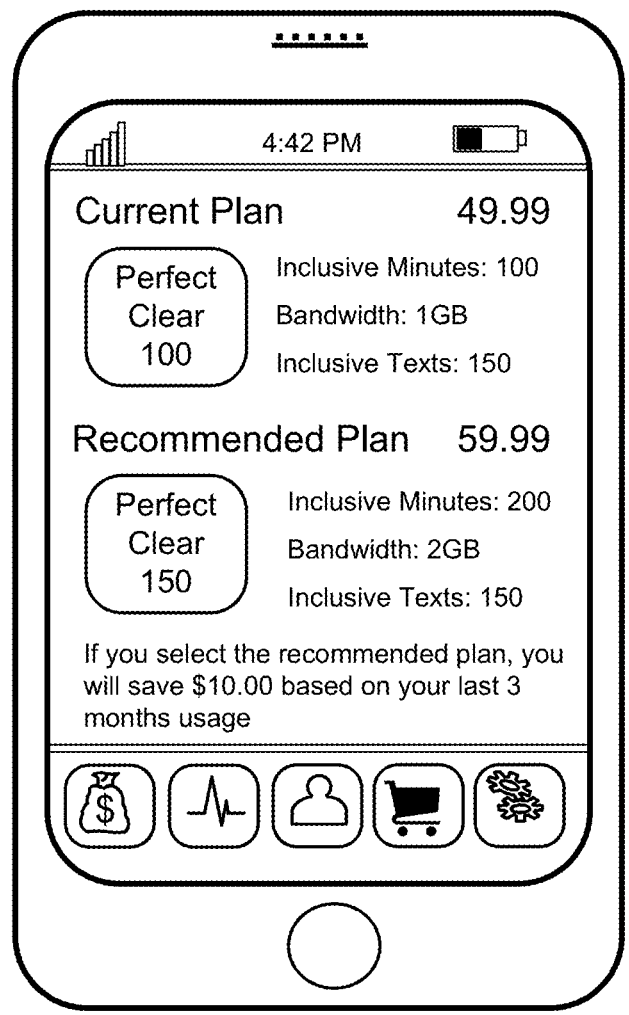

In an embodiment illustrated in FIG. 22, the user interaction system and the mobile application server 508 may be configured to support a subscription optimization service that enables the mobile application server 508 server to access information relating to a subscriber's current and past usage, and determine whether the subscriber is on the most cost effective plan. The mobile application server 508 may obtain such information from, for example, the charging system 532. The user interaction system may display an input screen that enables users to specify the historic time period to examine so as to only consider typical usage, which may be specified in days, weeks, months, etc. The mobile application server 508 may analyze how much the subscriber would have saved if he/she had changed his/her subscription at some point in the past, and send the computed information to the user equipment to be displayed. The mobile application server 508 may perform this analysis itself and notify users if they should consider changing subscription. The user interaction system may display an input screen that enables users to enter "what-if" scenarios (e.g., what is the most cost effective subscription if I increase my data downloads to 10 GB per month?), and the inputted information may be sent to the mobile application server 508 for processing/analysis.

In an embodiment, the user interaction system and the mobile application server 508 may be configured to support a personalized news service that enables network operators/service providers to send personalized news to the user equipment. The mobile application server 508 may be configured to enable network providers to specify a news item or a category of news items that are to be sent to the user equipment. The registered news items may relate to new services that might be of interest to the subscriber, sponsorship of events that are likely to be of interest to the subscriber, or news not related to the network operator. The mobile application server 508 may be configured to locate and send the registered news items to selected user equipment. The user equipment may receive and display the news item on an electronic display via the user interaction system.

In an embodiment, the user interaction system and the mobile application server 508 may be configured to support a subscriber survey functionality that enables the network operator to push surveys to the subscriber. The mobile application server 508 may be configured to collect or generate surveys and/or enable third parties to register surveys that are to be sent to the user equipment. Surveys may be a general, for which the subscriber was chosen randomly (e.g., "which of the following five services would you most like us to introduce next?") or directly related to an action of the subscriber (e.g., "we noticed that you have made 4 calls to the same number in the last 60 seconds. What was the problem? (a) I could not hear the other person (b) the other person could not hear me," etc.). The user interaction system may be configured to display rewards offered for completing a subscriber survey.

In an embodiment, the user interaction system and the mobile application server 508 may be configured to support a "customer support" service that enables users to manage support tickets on the user equipment. Support ticket management may include creating a ticket, monitoring the status of a ticket, updating a ticket, requesting a call from a representative of the network operator, etc.

Figure 23:
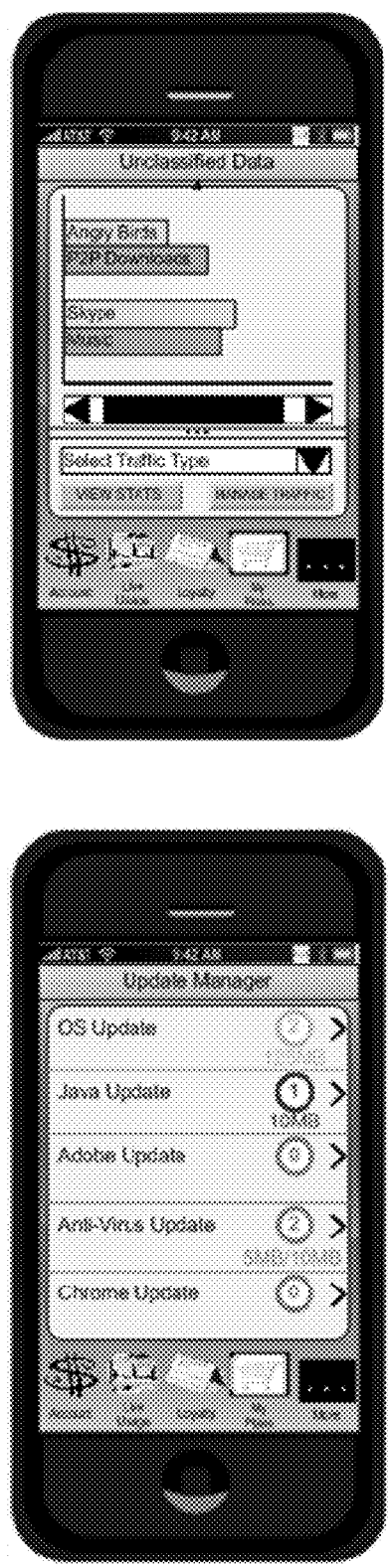

In an embodiment illustrated in FIG. 23, the user interaction system and the mobile application server 508 may be configured to support an "application based usage information" service that enables users to view usage information for each application or service. The user interaction system may display an input screen that enables users to select a time period for the usage information (e.g., per minute, hour, day, week, month, billing period, etc.). The displayed usage information may include usage caused by operating system and/or application updates. The application detection may be done on the user equipment 502.

Figure 24:

In an embodiment illustrated in FIG. 24, the user interaction system and the mobile application server 508 may be configured to support an "application based policy" service that enables users to set policies for each application. The policies may relate to thresholds and notifications, provide the ability to play, pause, and stop applications, may relate to the access network type, may provide the ability to apply thresholds and notifications, etc. The user interaction system may display an input screen that enables users to select a time period in which the policies are to be enforced. The user interaction system may display visual indicators to indicate the percentage of a quota that has been consumed (e.g., an empty to full bucket, green to red color change, etc.). Some policies may be mandatory and set by the network operator, others may be subscriber specified policies.

In an embodiment, the user interaction system and the mobile application server 508 may be configured to support an "application based charging" service that enables users to view charging information for each application. The user interaction system may display charging information (retrieved via the mobile application server 508) for each application.

Figure 25:

In an embodiment illustrated in FIG. 25, the user interaction system and the mobile application server 508 may be configured to support an "access network aware policies" service that enables a client application to apply different policies to the user equipment 502 depending on the type of access network (e.g., 3G, 4G, WiFi, etc.). The mobile application server 508 may communicate with a policy management system 530 in order to obtain these policies. Policies may be specified in terms of high-level goals (e.g., "I want the cheapest service," "I want the best service," "I want the most secure service," etc.). Policies may also be specified in terms of the access network type, or in terms of the services.

In an embodiment, the user interaction system and the mobile application server 508 may be configured to support a network wide aggregation functionality that enables a network operator to determine the effects of specific actions on groups of users. For example, the mobile application server 508 may be configured to compute costs associated with a group of users receiving the latest update to their user equipment 502 operating systems, and send such information to the network operator and/or user equipment. An action may be a system-wide event, and the groups may be chosen randomly.

In various embodiments, the mobile application server 508 may enable users to directly interact with their live charging information within a telecommunications network. The mobile application server 508 may receive a charging request from user equipment 502, identify a relevant charging system, and send a charging request to the identified charging system. The charging system may receive and process the charging request, and send the results of the processing back to the mobile application server 508. The mobile application server 508 may receive a response from the charging system, process the received response, and send the results of the processing to the user equipment 502. The charging request may be generated on an application running on the user equipment, and may relate to all charging information, including charging information associated with a specific subscriber, charging information associated with a subscriber defined counter, charging information associated with a specific service for a specific subscriber, charging information relating to services that are not telecommunications related, charging information associated with specific devices belonging to a specific subscriber. The charging requests may be requests to view charging information, increment a charging balance, decrement a charging balance, or modify charging information. Charging requests may relate to balance or spending rate thresholds being set.

The mobile application server 508 may be configured to send notifications when charging thresholds are breached. The mobile application server 508 may identify a relevant charging system based on information from a subscriber repository, availability and/or redundancy. The charging system may be one of an online charging system (OCS) or an offline charging system (OFCS) as defined by 3GPP.

The mobile application server 508 may be configured to predict future charging spending balances and rates based on current spending amounts and rates. This may be achieved on an aggregate basis, or on a per-service basis. Charging requests may enable a subscriber to obtain network connectivity without having a prior commercial relationship, additional telecommunications services, personalized subscription plans, non-telecommunications services (e.g., mCommerce, etc.).

The mobile application server 508 may be configured to enable the telecommunications services to be priced and purchased dynamically, allow for under-utilization and perishable services, and allow for over-utilization (e.g., congestion).

The mobile application server 508 may be configured to provide the subscriber with "advice of charge" information. The mobile application server 508 may provide the subscriber with the optimal subscription plan and additional services based on the subscriber's previous usage and spending. The charging information may relate to other interdependent information such as loyalty points.

The mobile application server 508 may be configured to operate in real-time, support multiple client types (including web application servers), provide functionality specific to a particular type of user equipment 502, and support an extremely high number of transactions.

The mobile application server 508 may include published integration points that offer a very low barrier to integration.

These published integration points may use simple and widely adopted protocols and formats such as SOAP, HTTP, and JSON. The system may enable user equipment 502 to obtain information from the mobile application server 508, either via using a pull model in which the information is requested by the user equipment 502, or via a push model in which the mobile application server 508 pushes the information to the user equipment 502. The information may be obtained on-demand or preemptively during periods of inactivity (of the user equipment 502 or of the telecommunications operator's network).

The mobile application server 508 may simplify the integration of client software on user equipment 502 by hiding stateful information. The mobile application server 508 may include security management functionality that protects the telecommunications operator's infrastructure from harmful, malicious, or fraudulent activity. The mobile application server 508 security features may include generic security features such as Network Address Translation (NAT), and/or application and context specific security features (e.g., application level firewalls, reverse proxy servers, etc.). The mobile application server 508 may provide front-end load balancing and routing for the client software on the user equipment 502. The mobile application server 508 may be deployed into a cloud environment. The mobile application server 508 may provide back-end load balancing and routing for the telecommunications operator's business and operating systems' infrastructure. The mobile application server 508 may use caching to improve performance. The caching may be based on customized caching algorithms that are application and context aware. The improved performance due to caching may be used to reduce the load on the telecommunications operator's business and operating systems' back-end infrastructure.

The mobile application server 508 may include a decision core engine configured to provide run-time adaptability and extensibility by supporting the addition, removal, and modification of business logic in real-time. These changes in business logic may occur at run-time, while the mobile application server 508 is online and in-service.

The mobile application server 508 may be configured to be context aware. The contextual awareness may relate to users and their usage, traffic, and spending patterns. The contextual awareness may relate to historical information, current information, and future predictive information.

The mobile application server 508 may generate contextual information via an analytics engine. The mobile application server 508 may use industry standard practices to improve reliability and performance. This may include the use of redundancy, clustering, and caching. The mobile application server 508 may use built-in standards based identification and authentication modules, such as RFC4005, HSS Diameter modules, and RADIUS AAA modules.

The mobile application server 508 may contain built-in security features, ensure data remains confidential, ensure access control models are implemented, and/or ensure users cannot access confidential information within the telecommunications operator's network. This confidential information may include private metadata relating to the use cases.

The mobile application server 508 may include functionality to immediately disable client software running on user equipment 502 that has been compromised or stolen. The mobile application server 508 may use behavioral heuristics to determine if user equipment 502 has been compromised or stolen. The mobile application server 508 may be configured with the identities of user equipment 502 that have been compromised or stolen. This configuration may be either set by the users and/or the telecommunications operator.

The mobile application server 508 may include built-in support for charging functionality. This charging functionality may be based on standard-based charging protocols, such as RFC3588, RFC4006, Rf, Ro, RADIUS Accounting, Diameter Accounting, and CAMEL.

The mobile application server 508 may be tightly integrated with a policy management system 530 (e.g., a PCRF). The mobile application server 508 may be tightly integrated with a charging system 532 (e.g., an OCS). The mobile application server 508 may be tightly integrated with a dynamic context router. The dynamic context router 702 may include a diameter routing agent (DRA).

The mobile application server 508 may be integrated with standard user equipment 502 applications. The mobile application server 508 may be integrated with the address book, calendar, etc. The mobile application server 508 may allow the easy integration of information from the mobile application server 508 with other sources. These other sources could include Web 2.0 sources such as Facebook®, Twitter®, Skype®, etc. These other sources may include policy and charging information.

The mobile application server 508 may use resource utilization information from the policy management system 530, in conjunction with rating information from the charging system, in order to advertise dynamically priced offers and perishable services to the subscriber via the software client. Further, the subscriber may purchase these dynamically priced offers and perishable services.

In an embodiment, the mobile application server 508 may enable users to create and adjust personalized subscription plans. These subscription plans may be based on changing individual service usage allowances, or individual constituent costs, while maintaining a constant subscription cost. These subscriptions may be based on contextual information, such as receiving discounted rates for usage within a subscriber-defined geographic area. The mobile application server 508 may provide topology hiding to the user equipment 502. This may prevent the discovery of network addresses.

The mobile application server 508 may provide QoS management. This QoS management may be controlled by the subscriber. This QoS management may be set mandatorily by the telecommunications operator.

The mobile application server 508 may support the promotion and distribution of offers and servers targeted directly at users who are roaming. The mobile application server 508 may enable users to manage additional devices associated with the telecommunications operator. These additional devices may include broadband routers and Femtocells.

The mobile application server 508 may enable users to apply discount and promotional offers that are available in their environs. These offers may be in the form of unique numbers that are manually input into the user equipment 502 by the subscriber. These offers may be in the form of 1D or 2D barcodes that are captured using a camera of the user equipment 502. These offers may be in the form of signals that are broadcast using a wireless technology such as Near Field Communications (NFC), Bluetooth, or WiFi.

The mobile application server 508 may provide the subscriber with contextual information. This contextual information may be displayed on user equipment 502 using graphics or text. This contextual information may also be rendered as audio. This contextual information may relate to location information, such as locating the nearest phone credit top-up location or Wi-Fi hotspot.

The mobile application server 508 may enable users to obtain real-time Advice-of-Charge (AoC) information. Users may set thresholds and alerts based on this AoC information. The mobile application server 508 may make recommendations to users regarding their charges. These recommendations may be based on changing the subscription plan. These recommendations may be based on adding service bundles.

Figure 26:
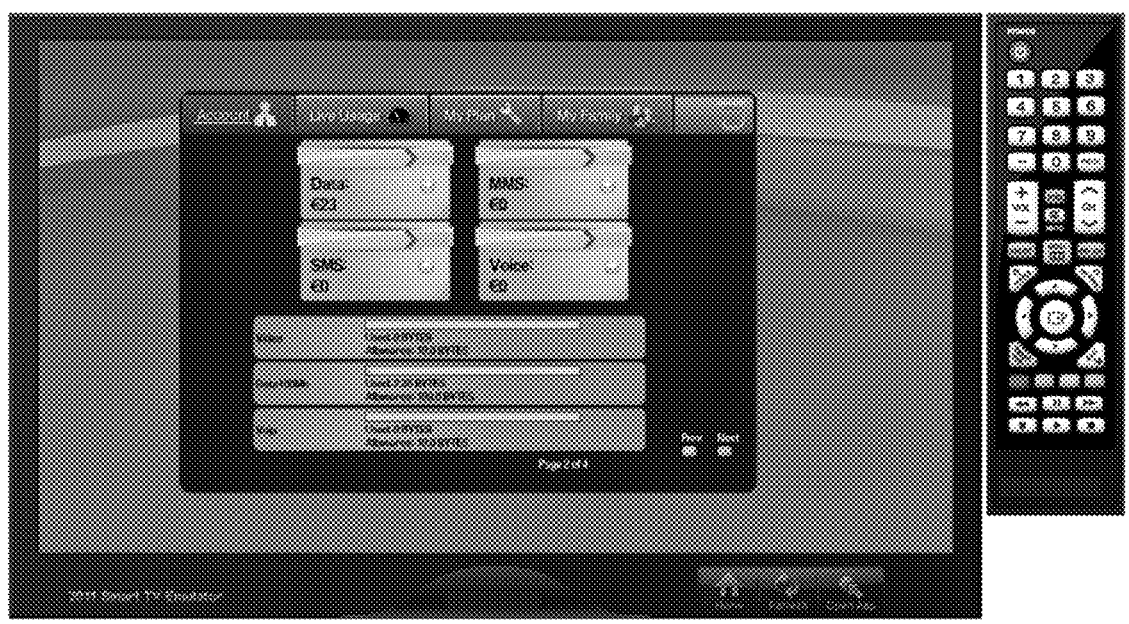
Figure 27:
Figure 28:

FIGS. 26-28 illustrate user equipment devices in the form of televisions configured with user interaction systems that provide a subscriber with access to information regarding his/her telecommunications service usage, charging, policy, service plans, subscription, account information and/or any other information relating to any of the use-cases listed above. The user interaction systems on network-enabled televisions may communicate with the mobile application server 508, perform computations via client software installed on the user equipment, access the charging system 532, the policy management system 530, or other network components via the mobile application server 508, and perform any and all of the operations discussed above.

FIG. 26 illustrates an interaction system on network-enabled television configured to provide a subscriber with access to information regarding his/her short message service (SMS) usage, data usage, multimedia message service (MMS) usage, voice usage, and other information in accordance with an embodiment. In this embodiment, the user equipment may be configured to access usage, policy, and charging information via the mobile application server 508, and present the information on the user interaction system in an easy to understand format. The embodiment may further include various user interface icons and/or buttons that, when touched or actuated, cause the device to send various types of information to the mobile application server 508, which may adjust the subscriber's information/settings accordingly.

FIG. 27 illustrates an interaction system on network-enabled television configured to provide a subscriber with access to information regarding his/her data plan, data usage, and subscription packages. In this embodiment, the user equipment may be configured to access usage plan, subscription, policy, and charging information via the mobile application server 508, and present the information on the user interaction system in an easy to understand format. The embodiment may further include various user interface icons and/or buttons that, when touched or actuated, cause the device to send various types of information to the mobile application server 508, which may adjust the subscriber's information/settings accordingly.

FIG. 28 illustrates an interaction system on network-enabled television configured to provide a subscriber with access managing accounts and services. In this embodiment, the user equipment may be configured to access policy and charging information via the mobile application server 508, and present the information on the user interaction system in an easy to understand format. The embodiment may further include various user interface icons and/or buttons that, when touched or actuated, cause the device to send various types of information to the mobile application server 508, which may adjust the subscriber's information/settings accordingly.

Figure 29:
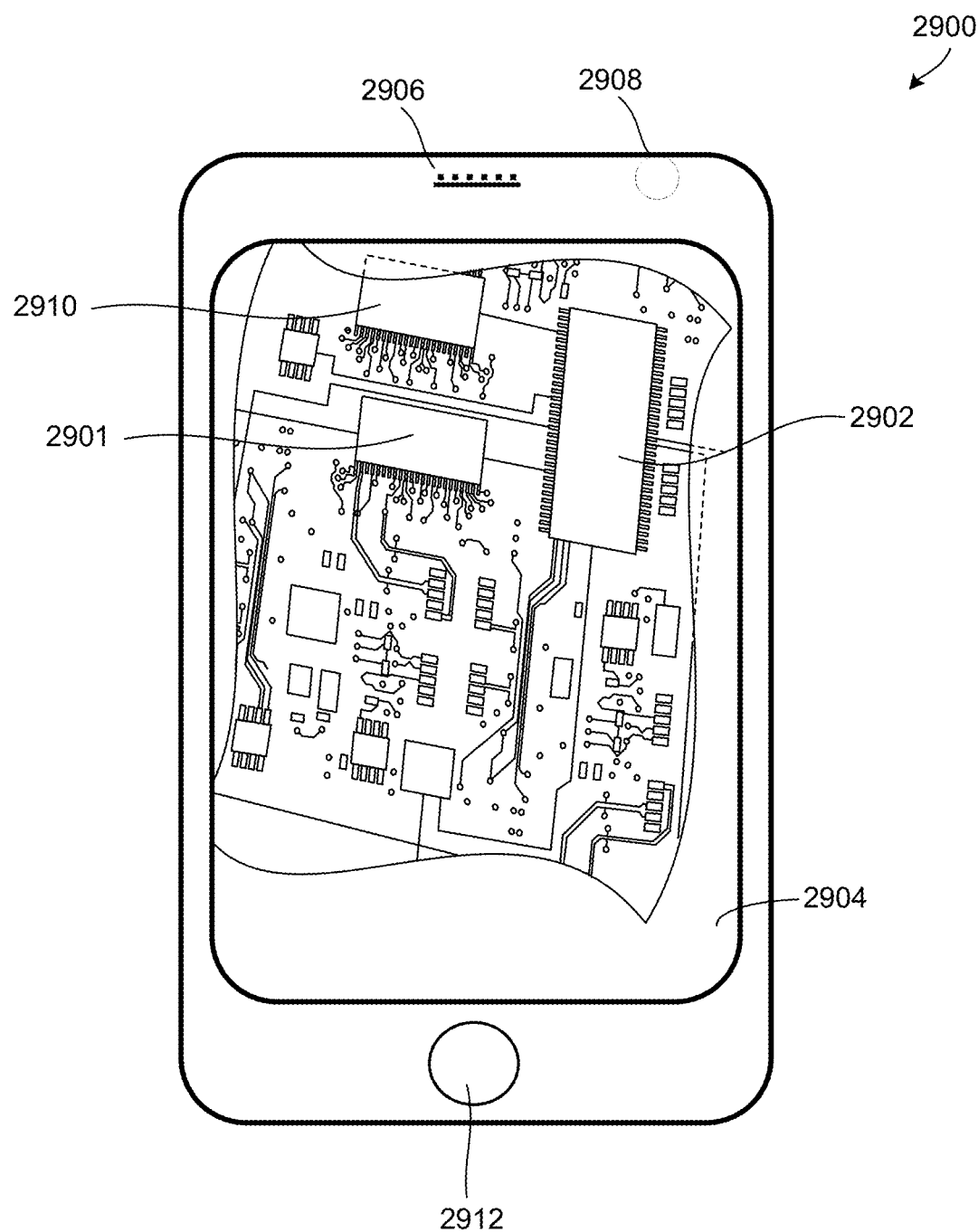
FIG. 29 is a system block diagram of a user equipment device in the form of a phone/cell phone suitable for use with various embodiments.

FIG. 29 is a system block diagram of a user equipment device in the form of a phone/cell phone suitable for use with various embodiments. A cell phone 2900 may include a processor 2901 coupled to internal memory 2902, a display 2904, and to a speaker 2906. Additionally, the cell phone 2900 may include an antenna 2908 for sending and receiving electromagnetic radiation that may be connected to a wireless data link and/or cellular telephone transceiver 2910 coupled to the processor 2901. Cell phones 2900 typically also include menu selection buttons 2912 or switches for receiving subscriber inputs.

Figure 30:
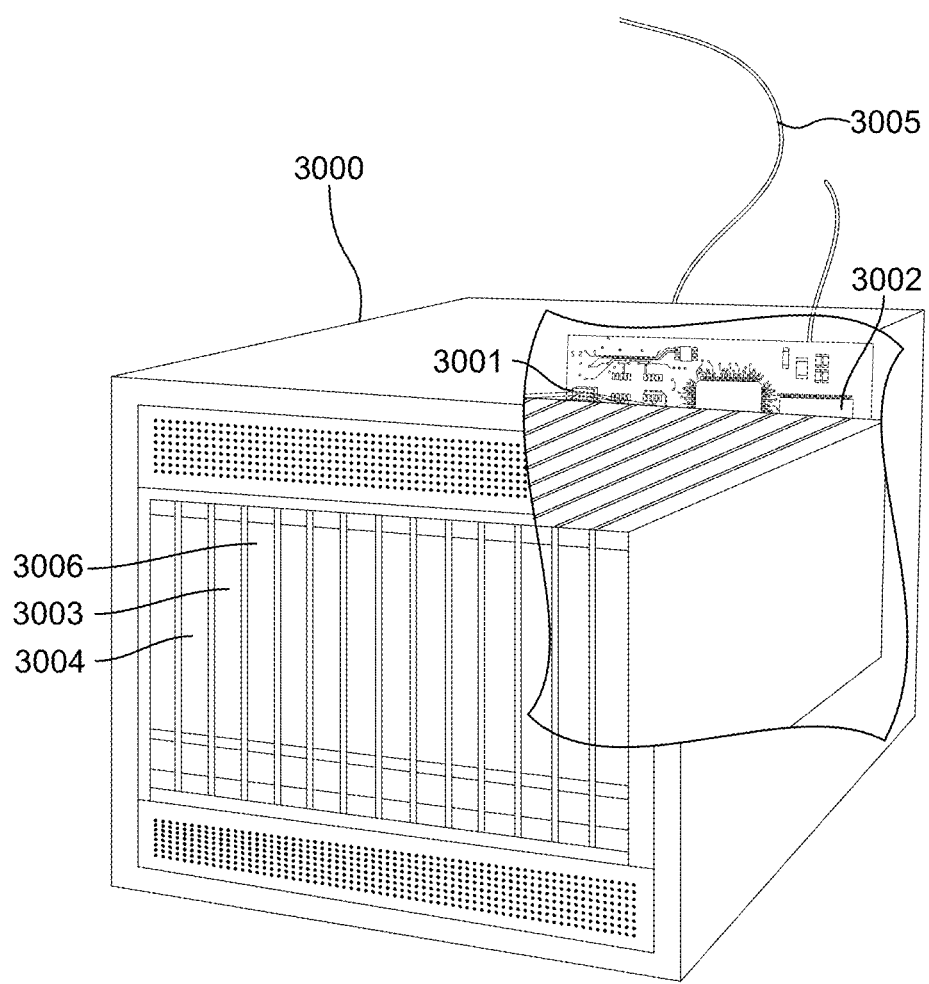
FIG. 30 is a system block diagram of a server suitable for use with an embodiment.

The various embodiments may be implemented on any of a variety of computing devices, including commercially available servers, such as the server 3000 illustrated in FIG. 30. Such a server 3000 typically includes a processor 3001 coupled to volatile memory 3002 and a large capacity nonvolatile memory, such as a disk drive 3003. The server 3000 may also include a floppy disc drive, compact disc (CD) or DVD disc drive 3006 coupled to the processor 3001. The server 3000 may also include network access ports 3004 coupled to the processor 3001 for establishing data connections with a network 3005, such as a local area network coupled to other operator network computers and servers.

The processors 2901, 3001 may be any programmable microprocessor, microcomputer or multiple processor chip or chips that can be configured by software instructions (applications) to perform a variety of functions, including the functions of the various embodiments described below. Multiple processors 2901, 3001 may be provided, such as one processor dedicated to wireless communication functions and one processor dedicated to running other applications. Typically, software applications may be stored in the internal memory 2902, 3002, 3003 before they are accessed and loaded into the processor 2901, 3001. The processor 2901, 3001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. Are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

What is claimed is:

1. A method of managing subscriber accounts in a telecommunication network, comprising:
   identifying, at a processor of a server computing device, a network access scheme associated with a subscriber account, wherein the network access scheme is one of:
      a current subscription plan associated with the subscriber account; or
      a current installed service pass associated with the subscriber account;
   receiving, at the processor of the server computing device, contextual information associated with the subscriber account from two or more components in the telecommunication network, the two or more components including at least one policy management system component and at least one charging system component;
   using the received contextual information to determine, at the processor of the server computing device, whether to notify a user associated with the subscriber account of an availability of a different network access scheme based on:
      whether any available service pass is more cost effective than the currently installed service pass;
      whether any available service pass will provide a user equipment device with an increased quality of service relative to the currently installed service pass;
      whether any available subscription plan will provide the user equipment device with an increased quality of service relative to the current subscription plan; or
      whether any available subscription plan is more cost effective than the current subscription plan; and
   sending information identifying the different network access scheme from the server computing device to the user equipment device associated with the subscriber account in response to determining to notify the user associated with the subscriber account of the availability of the different network access scheme, the sending of the information including sending a notification message to the user equipment device in response to determining that:
      at least one available service pass is more cost effective than the currently installed service pass;
      at least one available service pass will provide the increased quality of service relative to the currently installed service pass;
      at least one available subscription plan will provide the increased quality of service relative to the current subscription plan; or
      at least one available subscription plan is more cost effective than the current subscription plan.

2. The method of claim 1, wherein identifying network access scheme associated with the subscriber account comprises identifying one of:
   an actual data usage plan;
   an unlimited data usage plan;
   a data usage-limited plan; and
   a multi-user data usage plan.

3. The method of claim 1, further comprising:
   receiving the notification message in the user equipment device;
   displaying information included in the received notification message on an electronic display of the user equipment device;
   determining whether a user interface element of the user equipment device has been actuated after displaying information included in the received notification message on the electronic display;
   sending subscription-selection information from the user equipment device to the server computing device in response to determining that the user interface element of the user equipment device has been actuated; and
   adjusting, at the processor of the server computing device, the current subscription plan in response to receiving the subscription-selection information from the user equipment device.

4. The method of claim 3, wherein determining whether the user interface element of the user equipment device has been actuated comprises determining whether a quality of service (QoS) testing service has been activated, the method further comprising:
   determining, at the processor of the server computing device, a QoS parameter selected from the group including an uplink parameter, a downlink parameter, a bandwidth parameter, and a jitter parameter; and sending the determined QoS parameter from the server computing device to the user equipment device.

5. The method of claim 3, wherein adjusting the current subscription plan comprises:

determining a type of access network used by the user equipment device; and applying an access network aware policy based on the determined type of access network.

6. The method of claim 1, wherein using the received contextual information to determine whether to notify the user associated with the subscriber account of the availability of the different network access scheme comprises comparing, at the processor of the server computing device, predicted service usage levels with a plurality of available subscription plans.

7. The method of claim 1, wherein receiving the contextual information associated with the subscriber account from the two or more components in the telecommunication network further comprises receiving the contextual information from:

a subscriber repository component; or an analytics system component.

8. The method of claim 1, wherein receiving the contextual information associated with the subscriber account from the two or more components in the telecommunication network further comprises receiving network utilization information.

9. The method of claim 8, wherein:

receiving network utilization information from the two or more components in the telecommunication network further comprises receiving information that indicates the user equipment device has requested to access a service during a peak hour; and sending information identifying the different network access scheme from the server computing device to the user equipment device associated with the subscriber account comprises sending an offer for the use of the requested service after the peak hour.

10. The method of claim 1, wherein:

using the received contextual information to determine whether to notify the user associated with the subscriber account of the availability of the different network access scheme further comprises determining, at the processor of the server computing device, whether the user equipment device is currently in a roaming state; and sending information identifying the different network access scheme from the server computing device to the user equipment device associated with the subscriber account further comprises sending a roaming-related service pass to the user equipment device.

11. The method of claim 1, wherein:

using the received contextual information to determine whether to notify the user associated with the subscriber account of the availability of the different network access scheme further comprises identifying, at the processor of the server computing device, a category of users that are similar to the user; and sending information identifying the different network access scheme from the server computing device to the user equipment device associated with the subscriber account further comprises sending a targeted service pass from the server computing device to the user equipment device based on the identified category of users.

12. The method of claim 1, further comprising receiving, at the processor of the server computing device, information identifying a time period from the user equipment device, wherein using the received contextual information to determine whether to notify the user associated with the subscriber account of the availability of the different network access scheme further comprises analyzing, at the processor of the server computing device, at least one available subscription plan based on information identifying the user equipment device's service usage levels during the time period.

13. The method of claim 1, further comprising determining, at the processor of the server computing device, whether information identifying the different network access scheme has previously been sent to the user equipment device, wherein sending the information identifying the different network access scheme from the server computing device to the user equipment device associated with the subscriber account comprises sending the information identifying the different network access scheme to the user equipment device in response to determining that the information identifying the different network access scheme has not previously been sent to the user equipment device.

14. The method of claim 1, wherein sending information identifying the different network access scheme from the server computing device to the user equipment device associated with the subscriber account further comprises:

determining, at the processor of a server computing device, that the subscriber account is associated with a plurality of user equipment devices;

identifying, at the processor of a server computing device, the user equipment device as a most appropriate device for receiving information identifying the different network access scheme; and sending information identifying the different network access scheme from the server computing device to the user equipment device in response to identifying the user equipment device as the most appropriate device for receiving the information identifying the different network access scheme.

15. A server computing device, comprising:

a processor configured with processor-executable instructions to perform operations comprising:

identifying a network access scheme associated with a subscriber account, wherein the network access scheme is one of:

a current subscription plan associated with the subscriber account; or a current installed service pass associated with the subscriber account;

receiving contextual information associated with the subscriber account from two or more components in a telecommunication network, the two or more components including at least one policy management system component and at least one charging system component;

using the received contextual information to determine whether to notify a user associated with the subscriber account of an availability of a different network access scheme based on:

whether any available service pass is more cost effective than the currently installed service pass;

whether any available service pass will provide a user equipment device with an increased quality of service relative to the currently installed service pass;

whether any available subscription plan will provide the user equipment device with an increased quality of service relative to the current subscription plan; or whether any available subscription plan is more cost effective than the current subscription plan; and sending information identifying the different network access scheme to the user equipment device associated with the subscriber account in response to determining to notify the user associated with the subscriber account of the availability of the different network access scheme, the sending of the information including sending a notification message to the user equipment device in response to determining that:

at least one available service pass is more cost effective than the currently installed service pass;

at least one available service pass will provide the increased quality of service relative to the currently installed service pass;

at least one available subscription plan will provide the increased quality of service relative to the current subscription plan; or at least one available subscription plan is more cost effective than the current subscription plan.

16. A non-transitory computer readable storage medium having stored thereon processor-executable software instructions configured to cause a processor to perform operations for managing subscriber accounts in a telecommunication network, the operations comprising:

identifying a network access scheme associated with a subscriber account, wherein the network access scheme is one of:

a current subscription plan associated with the subscriber account;

or a current installed service pass associated with the subscriber account;

receiving contextual information associated with the subscriber account from two or more components in the telecommunication network, the two or more components including at least one policy management system component and at least one charging system component;

using the received contextual information to determine whether to notify a user associated with the subscriber account of an availability of a different network access scheme based on:

whether any available service pass is more cost effective than the currently installed service pass;

whether any available service pass will provide a user equipment device with an increased quality of service relative to the currently installed service pass;

whether any available subscription plan will provide the user equipment device with an increased quality of service relative to the current subscription plan; or whether any available subscription plan is more cost effective than the current subscription plan; and sending information identifying the different network access scheme to the user equipment device associated with the subscriber account in response to determining to notify the user associated with the subscriber account of the availability of the different network access scheme, the sending of the information including sending a notification message to the user equipment device in response to determining that:

at least one available service pass is more cost effective than the currently installed service pass;

at least one available service pass will provide the increased quality of service relative to the currently installed service pass;

at least one available subscription plan will provide the increased quality of service relative to the current subscription plan; or at least one available subscription plan is more cost effective than the current subscription plan.

\* \* \* \* \*